United States Patent
Bergström et al.

(10) Patent No.: US 10,069,603 B2
(45) Date of Patent: Sep. 4, 2018

(54) EFFICIENT HARQ FEEDBACK

(71) Applicant: Telefonaktiebolaget LM Ericsson (publ), Stockholm (SE)

(72) Inventors: Andreas Bergström, Vikingstad (SE); Niclas Wiberg, Linköping (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 135 days.

(21) Appl. No.: 15/111,035

(22) PCT Filed: Jun. 1, 2016

(86) PCT No.: PCT/SE2016/050514
§ 371 (c)(1),
(2) Date: Jul. 12, 2016

(87) PCT Pub. No.: WO2017/138853
PCT Pub. Date: Aug. 17, 2017

(65) Prior Publication Data
US 2017/0373801 A1    Dec. 28, 2017

Related U.S. Application Data

(60) Provisional application No. 62/293,148, filed on Feb. 9, 2016, provisional application No. 62/295,722, filed on Feb. 16, 2016.

(51) Int. Cl.
*H04B 3/36*   (2006.01)
*H04B 7/14*   (2006.01)
(Continued)

(52) U.S. Cl.
CPC .......... *H04L 1/1835* (2013.01); *H04L 1/0027* (2013.01); *H04L 1/1812* (2013.01); *H04W 72/042* (2013.01)

(58) Field of Classification Search
CPC .. H04W 72/042; H04L 1/0027; H04L 1/1812; H04L 1/1835
See application file for complete search history.

(56) References Cited

U.S. PATENT DOCUMENTS

2011/0035639 A1* 2/2011 Earnshaw ............. H04L 1/1812
                                                    714/748
2011/0110246 A1* 5/2011 Damnjanovic ....... H04L 1/0028
                                                    370/252
(Continued)

FOREIGN PATENT DOCUMENTS

| EP | 1830484 A1 | 9/2007 |
| EP | 2693816 A1 | 2/2014 |
| WO | 2013170121 A1 | 11/2013 |

OTHER PUBLICATIONS

Author Unknown, "Technical Specification Group Radio Access Network; Evolved Universal Terrestrial Radio Access (E-UTRA); Physical channels and modulation (Release 11)," Technical Specification 36.211, Version 11.6.0, 3GPP Organizational Partners, Sep. 2014, 120 pages.

(Continued)

*Primary Examiner* — Dominic Rego
(74) *Attorney, Agent, or Firm* — Withrow & Terranova, PLLC

(57) ABSTRACT

Systems and methods are disclosed for providing efficient downlink Hybrid Automatic Request (HARQ) feedback. In some embodiments, a method of operation of a wireless device in a cellular communications system comprises receiving downlink control information from a radio access node in a first subframe T. The downlink control information comprises an indication of a HARQ timing offset K. The method further comprises transmitting downlink HARQ feedback to the radio access node in a subframe T+K. In this (Continued)

manner, HARQ feedback can be directly scheduled by the network, which in turn enables efficient HARQ feedback.

22 Claims, 31 Drawing Sheets

(51) Int. Cl.
   *H04L 1/18* (2006.01)
   *H04W 72/04* (2009.01)
   *H04L 1/00* (2006.01)

(56) References Cited

U.S. PATENT DOCUMENTS

| | | | |
|---|---|---|---|
| 2011/0305214 A1* | 12/2011 | Seol | H04L 1/1864 370/329 |
| 2012/0266038 A1* | 10/2012 | Ou | H04L 1/1896 714/748 |
| 2013/0235829 A1 | 9/2013 | Pani et al. | |
| 2014/0362798 A1* | 12/2014 | Shu | H04L 1/1854 370/329 |
| 2015/0063236 A1* | 3/2015 | Seo | H04W 12/00 370/329 |
| 2015/0063247 A1* | 3/2015 | Lee | H04W 72/042 370/329 |
| 2016/0037524 A1 | 2/2016 | Krzymien et al. | |
| 2016/0105907 A1* | 4/2016 | Lee | H04W 16/14 370/336 |
| 2016/0211903 A1* | 7/2016 | Damnjanovic | H04B 7/0626 |
| 2017/0181165 A1* | 6/2017 | Au | H04W 72/0446 |
| 2017/0223687 A1* | 8/2017 | Kuchibhotla | H04W 72/042 |

OTHER PUBLICATIONS

Author Unknown, "Technical Specification Group Radio Access Network; Evolved Universal Terrestrial Radio Access (E-UTRA); Multiplexing and channel coding (Release 11)," Technical Specification 36.212, Version 11.6.0, 3GPP Organizational Partners, Sep. 2015, 84 pages.
Author Unknown, "Technical Specification Group Radio Access Network; Evolved Universal Terrestrial Radio Access (E-UTRA); Physical layer procedures (Release 11)," Technical Specification 36.213, Version 11.11.0, 3GPP Organizational Partners, Jun. 2015, 183 pages.
Office Action and Search Report for Taiwanese Patent Application No. 10621011030, dated Sep. 30, 2017, 17 pages.
Panasonic, "R1-105484: Further considerations on ACK/NACK multiplexing schemes on PUSCH," 3rd Generation Partnership Project (3GPP), TSG RAN WG1 Meeting #62bis, Oct. 11-15, 2010, 3 pages, Xi'an, China.
Texas Instruments, "R1-083127: Concurrent Transmission of Multiple ACK/NAK and SRI in TDD UL," 3rd Generation Partnership Project (3GPP), TSG RAN WG1 #54, Aug. 18-22, 2008, 3 pages, Jeju, South Korea.
International Search Report and Written Opinion for International Patent Application No. PCT/SE2016/050514, dated Oct. 31, 2016, 15 pages.
Invitation to Pay Additional Fees for International Patent Application No. PCT/SE2016/050515, dated Oct. 24, 2016, 11 pages.
Qualcomm Incorporated, "R1-104782: Number of Bits Conveyed on Multi-bit-ACK PUCCH Format," 3rd Generation Partnership Project (3GPP), TSG-RAN WG1 #62, Aug. 23-27, 2010, 6 pages, Madrid, Spain.
International Search Report and Written Opinion for International Patent Application No. PCT/SE2016/050515, dated Jan. 18, 2017, 29 pages.

\* cited by examiner

EFFICIENT HARQ FEEDBACK

RELATED APPLICATIONS

This application is a 35 U.S.C. § 371 national phase filing of International Application No. PCT/SE2016/050514, filed Jun. 1, 2016, which claims the benfit of U.S. Provisional Application No. 62/295,722, filed Feb. 16, 2016, and U.S. Provisional Application No. 62/293,148, filed Feb. 9, 2016, the disclosures of which are incorporated herein by reference in their entireties.

TECHNICAL FIELD

The present disclosure relates to downlink Hybrid Automatic Repeat Request (HARQ) feedback in a cellular communications network.

BACKGROUND

Advanced Antenna Systems (AASs) is an area where technology has advanced significantly in recent years and where a rapid technology development in the years to come is foreseen. Hence, it is natural to assume that AASs in general and massive Multiple Input Multiple Output (MIMO) transmission and reception in particular will be a cornerstone in a future Fifth Generation (5G) cellular communication system.

Beam-forming has become increasingly popular and capable and, therefore, it is natural to use beam-forming not only for transmission of data but also for transmission of control information. This is one motivation behind the (relatively) new control channel in Long Term Evolution (LTE) known as the enhanced Physical Downlink Control Channel (ePDCCH). When beam-forming is used for the control channel, the cost of transmitting the overhead control information can be reduced due to the increased link budget provided by the additional antenna gain. This is a good property that is also desirable for 5G, perhaps to an even larger degree than what is possible in the current LTE standard.

For downlink Hybrid Automatic Repeat Request (HARQ) transmissions in LTE today, HARQ feedback is sent from the User Equipment device (UE) to the network on either the Physical Uplink Control Channel (PUCCH) or the Physical Uplink Shared Channel (PUSCH), depending on whether the UE has been scheduled for uplink PUSCH transmission or not. The network can thereafter, on an individual HARQ process basis, draw conclusions on whether the last HARQ reception for that process was successful or not (Acknowledgement/Negative Acknowledgement (ACK/NACK)) or even if the downlink assignment reception failed (Discontinuous Transmission (DTX)).

The timing of the transmitted HARQ feedback in LTE is such that, for Frequency Division Duplexing (FDD), the feedback from one HARQ receive process is received in the uplink in subframe n+4 if the corresponding downlink transmission for that HARQ receive process was in subframe n. Thus, the delay between the downlink transmission and the corresponding HARQ feedback is 4 milliseconds (ms) in total. For Time Division Duplexing (TDD), the delay from downlink data transmission to uplink feedback reception may be larger than 4 ms (or equivalently 4 subframes) in order accommodate the half-duplex downlink-uplink split.

For 5G, the HARQ feedback is to be transmitted as part of the Uplink Control Information (UCI) on xPUCCH. As used herein, "xPUCCH" is a term used to refer to the physical uplink control channel in a future generation cellular communications network, e.g. 5G.

The uplink control channel—xPUCCH—may be transmitted on one Orthogonal Frequency Division Multiplexing (OFDM) symbol. This channel will provide a limited number of bits (say, e.g., 1 to 4 information bits) by either: having a number of fixed formats (similar to LTE PUCCH format 1/1a/1b) or having one single format, still allowing for a flexible number of information bits. In regard to using a single format for a flexible number of information bits, performance may possibly be improved with fewer used information bits, since this allows the unused information bits to be used as a short training sequence. Further, it is assumed that there will be an implicit mapping from Downlink Control Information (DCI) Control Channel Elements (CCEs) to UCI CCEs, similar as for LTE.

Existing HARQ techniques are not 100% reliable, are inflexible, and consume a significant amount of resources. As such, there is a need for improved HARQ techniques, particularly ones that are suitable for future generation cellular communications networks such as, for example, a 5G cellular communications network.

SUMMARY

Systems and methods are disclosed for providing efficient downlink Hybrid Automatic Request (HARQ) feedback. In some embodiments, a method of operation of a wireless device in a cellular communications system comprises receiving Downlink Control Information (DCI) from a radio access node in a first subframe T. The DCI comprises an indication of a HARQ timing offset K. The method further comprises transmitting downlink HARQ feedback to the radio access node in a subframe T+K. In this manner, HARQ feedback can be directly scheduled by the network, which in turn enables efficient HARQ feedback.

In some embodiments, the method further comprises combining a plurality of downlink HARQ feedback flags into a single downlink HARQ feedback transmission. Further, transmitting the HARQ feedback in the subframe T+K comprises transmitting the single downlink HARQ feedback transmission in the subframe T+K. In some embodiments, combining the plurality of downlink HARQ feedback flags into the single downlink HARQ feedback transmission comprises jointly encoding the plurality of downlink HARQ feedback flags into a codeword for the single downlink HARQ feedback transmission.

In some embodiments, the DCI further comprises information that indicates which feedback flags are to be combined into the single downlink HARQ feedback transmission.

In some embodiments, the indication of the HARQ timing offset K is a value for the HARQ timing offset K. In other embodiments, the indication of the HARQ timing offset K is a value S, wherein the HARQ timing offset K=N+S, where N is a predefined value. In other embodiments, the indication of the HARQ timing offset K is a value S, wherein the HARQ timing offset K=N+S, where N is a preconfigured value. In other embodiments, the indication of the HARQ timing offset K is a value S, wherein the HARQ timing offset K=N+S, where N is a predetermined minimum HARQ timing offset of the wireless device. In other embodiments, the indication of the HARQ timing offset K is a value X, wherein the HARQ timing offset K is a function of the value X.

In some embodiments, the HARQ feedback comprises a HARQ feedback flag. The HARQ feedback flag is an Acknowledgement (ACK) if respective downlink data was successfully received by the wireless device, a Negative Acknowledgment (NACK) if the respective downlink data was not successfully received by the wireless device, and an indication of a DCI failure if respective DCI was not received by the wireless device.

Embodiments of a wireless device are also disclosed. In some embodiments, a wireless device for a cellular communications system is adapted to receive DCI from a radio access node in a first subframe T. The DCI comprises an indication of a HARQ timing offset K. The wireless device is further adapted to transmit downlink HARQ feedback to the radio access node in a subframe T+K. In some embodiments, the wireless device is further adapted to perform the method of operation of a wireless device according to any of the embodiments disclosed herein.

In some embodiments, a wireless device for a cellular communications system comprises a transceiver, at least one processor, and memory storing instructions that are executable by the at least one processor whereby the wireless device is operable to receive, via the transceiver, DCI from a radio access node in a first subframe T. The DCI comprises an indication of a HARQ timing offset K. Via execution of the instructions by the at least one processor, the wireless device is further operable to transmit, via the transceiver, downlink HARQ feedback to the radio access node in a subframe T+K.

In some embodiments, by execution of the instructions by the at least one processor, the wireless device is further operable to combine a plurality of downlink HARQ feedback flags into a single downlink HARQ feedback transmission, wherein, in order to transmit the downlink HARQ feedback in the subframe T+K, the wireless device is operable to transmit, via the transceiver, the single downlink HARQ feedback transmission in the subframe T+K. Further, in some embodiments, in order to combine the plurality of downlink HARQ feedback flags into the single downlink HARQ feedback transmission, the wireless device is further operable to jointly encode the plurality of downlink HARQ feedback flags into a codeword for the single downlink HARQ feedback transmission.

In some embodiments, the DCI further comprises information that indicates which feedback flags are to be combined into the single downlink HARQ feedback transmission.

In some embodiments, the indication of the HARQ timing offset K is a value for the HARQ timing offset K. In other embodiments, the indication of the HARQ timing offset K is a value S, wherein the HARQ timing offset K=N+S, where N is a predefined value. In other embodiments, the indication of the HARQ timing offset K is a value S, wherein the HARQ timing offset K=N+S, where N is a preconfigured value. In other embodiments, the indication of the HARQ timing offset K is a value S, wherein the HARQ timing offset K=N+S, where N is a predetermined minimum HARQ timing offset of the wireless device. In other embodiments, the indication of the HARQ timing offset K is a value X, wherein the HARQ timing offset K is a function of the value X.

In some embodiments, the HARQ feedback comprises a HARQ feedback flag. The HARQ feedback flag is an ACK if respective downlink data was successfully received by the wireless device, a NACK if the respective downlink data was not successfully received by the wireless device, and an indication of a DCI failure if respective DCI was not received by the wireless device.

In some embodiments, a wireless device for a cellular communications system comprises means for receiving DCI from a radio access node in a first subframe T. The DCI comprises an indication of a HARQ timing offset K. The wireless device further comprises means for transmitting downlink HARQ feedback to the radio access node in a subframe T+K.

In some embodiments, a wireless device for a cellular communications system comprising a receiving module operable to receive DCI from a radio access node in a first subframe T. The DCI comprises an indication of a HARQ timing offset K. The wireless device further comprises a transmitting module operable to transmit downlink HARQ feedback to the radio access node in a subframe T+K.

Embodiments of a method of operation of a radio access node in a cellular communications system are also disclosed. In some embodiments, a method of operation of a radio access node comprises transmitting DCI to a wireless device in a first subframe T. The DCI comprises an indication of a HARQ timing offset K. The method further comprises receiving downlink HARQ feedback from the wireless device in a subframe T+K.

In some embodiments, the downlink HARQ feedback in the subframe T+K comprises a single downlink HARQ feedback transmission in the subframe T+K that is a combination of a plurality of downlink HARQ feedback flags. Further, in some embodiments, the single downlink HARQ feedback transmission is representative of a joint encoding of the plurality of downlink HARQ feedback flags.

In some embodiments, the DCI further comprises information that indicates which feedback flags are to be combined into the single downlink HARQ feedback transmission.

In some embodiments, the indication of the HARQ timing offset K is a value for the HARQ timing offset K. In other embodiments, the indication of the HARQ timing offset K is a value S, wherein the HARQ timing offset K=N+S, where N is a predefined value. In other embodiments, the indication of the HARQ timing offset K is a value S, wherein the HARQ timing offset K=N+S, where N is a preconfigured value. In other embodiments, the indication of the HARQ timing offset K is a value S, wherein the HARQ timing offset K=N+S, where N is a predetermined minimum HARQ timing offset of the wireless device. In other embodiments, the indication of the HARQ timing offset K is a value X, wherein the HARQ timing offset K is a function of the value X.

In some embodiments, the HARQ feedback comprises a HARQ feedback flag. The HARQ feedback flag is an ACK if respective downlink data was successfully received by the wireless device, a NACK if the respective downlink data was not successfully received by the wireless device, and an indication of a DCI failure if respective DCI was not received by the wireless device.

Embodiments of a radio access node for a cellular communications system are also disclosed. In some embodiments, a radio access node is adapted to transmit DCI to a wireless device in a first subframe T. The DCI comprises an indication of a HARQ timing offset K. The radio access node is further adapted to receive downlink HARQ feedback from the wireless device in a subframe T+K. In some embodiments, the radio access node is further adapted to perform the method of operation of a radio access node according to any of the embodiments described herein.

In some embodiments, a radio access node for a cellular communications system comprises at least one radio unit, at least one processor, and memory storing instructions that are executable by the at least one processor whereby the radio access node is operable to transmit, via the at least one radio unit, DCI to a wireless device in a first subframe T. The DCI comprises an indication of a HARQ timing offset K. By execution of the instructions by the at least one processor, the radio access node is further operable to receive, via the at least one radio unit, downlink HARQ feedback from the wireless device in a subframe T+K.

In some embodiments, the downlink HARQ feedback in the subframe T+K comprises a single downlink HARQ feedback transmission in the subframe T+K that is a combination of a plurality of downlink HARQ feedback flags. Further, in some embodiments, the single downlink HARQ feedback transmission is representative of a joint encoding of the plurality of downlink HARQ feedback flags.

In some embodiments, the DCI further comprises information that indicates which feedback flags are to be combined into the single downlink HARQ feedback transmission.

In some embodiments, the indication of the HARQ timing offset K is a value for the HARQ timing offset K. In other embodiments, the indication of the HARQ timing offset K is a value S, wherein the HARQ timing offset K=N+S, where N is a predefined value. In other embodiments, the indication of the HARQ timing offset K is a value S, wherein the HARQ timing offset K=N+S, where N is a preconfigured value. In other embodiments, the indication of the HARQ timing offset K is a value S, wherein the HARQ timing offset K=N+S, where N is a predetermined minimum HARQ timing offset of the wireless device. In other embodiments, the indication of the HARQ timing offset K is a value X, wherein the HARQ timing offset K is a function of the value X.

In some embodiments, the HARQ feedback comprises a HARQ feedback flag. The HARQ feedback flag is an ACK if respective downlink data was successfully received by the wireless device, a NACK if the respective downlink data was not successfully received by the wireless device, and an indication of a DCI failure if respective DCI was not received by the wireless device.

In some embodiments, a radio access node for a cellular communications system comprises means for transmitting DCI to a wireless device in a first subframe T. The DCI comprises an indication of a HARQ timing offset K. The radio access node further comprises means for receiving downlink HARQ feedback from the wireless device in a subframe T+K.

In some embodiments, a radio access node for a cellular communications system comprises a transmitting module operable to transmit DCI to a wireless device in a first subframe T. The DCI comprises an indication of a HARQ timing offset K. The radio access node further comprises a receiving module operable to receive downlink HARQ feedback from the wireless device in a subframe T+K.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
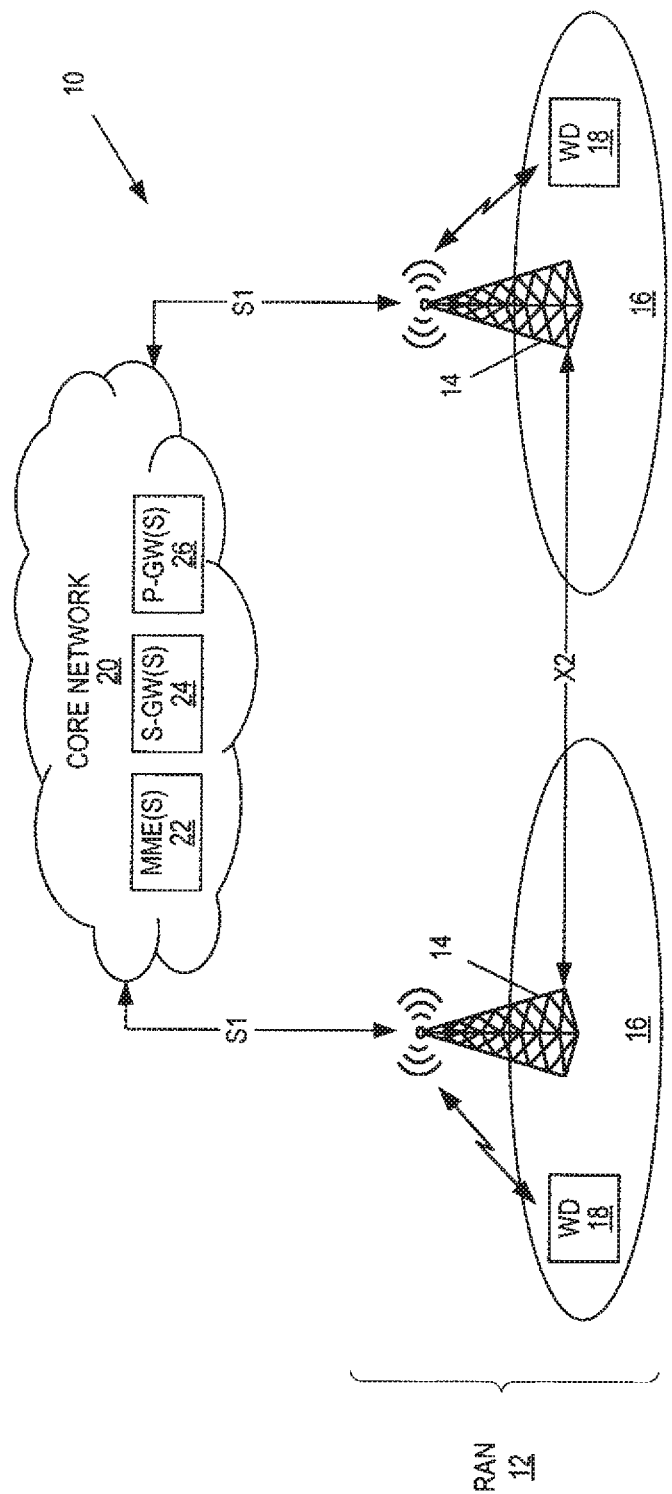
FIG. 1 illustrates a cellular communications system according to one embodiment of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station such as, for example, an enhanced or evolved Node B (eNB) in a Third Generation Partnership Project (3GPP) Long Term Evolution (LTE) network; a high-power or macro base station; a low-power base station such as, for example, a micro base station, a pico base station, a home eNB, or the like; and a relay node.

Wireless Device: As used herein, a "wireless device" is any type of device that has access to, i.e., is served by, a cellular communications network by wirelessly transmitting and/or receiving signals to a radio access node(s). Some examples of a wireless device include, but are not limited to, a User Equipment device (UE) in a 3GPP LTE network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

Before discussing embodiments of the present disclosure, a discussion of some problems associated with existing Hybrid Automatic Repeat Request (HARQ) solutions is beneficial. The current HARQ protocol of LTE is not 100% reliable; hence, LTE also uses the higher layer Radio Link Control (RLC) Acknowledged Mode (AM) to ensure reliability. Also, the current HARQ protocol is based on many strict timing relations such as, e.g., per synchronous HARQ timing operation, something which is very inflexible and causes several problems when, e.g., operating using dynamic Time Division Duplexing (TDD) as is expected to be very common for 5G.

Furthermore, the HARQ feedback protocol for 5G is desired to be both very fast and in particular much faster than LTE, but still not overusing the x Physical Uplink Control Channel (xPUCCH) resources. Hence, what is desired is a HARQ feedback mechanism that can be adapted in terms of feedback delay vs. xPUCCH resource consumption in a rather dynamic manner depending on, e.g., the robustness and/or delay requirement of the user-plane data service.

The present disclosure provides systems and methods relating to downlink HARQ feedback that are particularly well-suited for future generation cellular communications networks, e.g., 5G networks, but are not limited thereto. In some embodiments, feedback flags from a number of downlink HARQ transmissions are bundled into a single HARQ feedback transmission. In some embodiments, the network uses Downlink Control Information (DCI) to instruct the UE which feedback flags should be combined into a HARQ feedback transmission and when and how it should be transmitted.

The present disclosure proposes a fast and efficient downlink HARQ feedback mechanism for, e.g., 5G xPUCCH. In some embodiments, the mechanism allows for a variable number of HARQ feedback flags (Acknowledgement/Negative Acknowledgement (ACK/NACK)) to be included in one HARQ feedback transmission. Two different variants are presented:
  Directly scheduled wherein each DCI will directly schedule one uplink feedback of ACK/NACK on xPUCCH.
  By polling wherein the receive result is stored in a feedback buffer, which is reported upon request by the network. The receive results is, e.g., ACK, NACK, or, in some embodiments, Discontinuous Transmission (DTX).

Both variants further allow for DTX detection, i.e., the case when the DCI was not heard, as discussed below.

Embodiments of the present disclosure provide a fast and efficient downlink HARQ feedback mechanism for, e.g., 5G xPUCCH. It regulates the amount of xPUCCH resources used per UE, yet allows for a very fast feedback. Also, embodiments of the downlink HARQ feedback mechanism disclosed herein may be fully scheduled by the network, making it possible to dynamically adapt in terms of resource consumption vs. feedback delay depending on the user-plane service requirements. Embodiments of the downlink HARQ feedback mechanism disclosed herein allows for DTX detection.

Embodiments of the present disclosure are implemented in a cellular communications system, or network. One non-limiting example of a cellular communications system 10 is illustrated in FIG. 1. As illustrated, the cellular communications system 10 includes a Radio Access Network (RAN) 12 including a number of radio access nodes, which in this illustrated example are base stations 14. The base stations 14 are sometimes more generally referred to herein as radio access nodes 14. In 3GPP, the base stations 14 may be, for example, eNBs or low-power base stations (e.g., pico, micro, femto, or home base stations). The base stations 14 provide radio access to wireless devices 18 such as, e.g., UEs, in corresponding cells 16 of the base stations 14. Note that while cells 16 are shown in the example of FIG. 1, in other embodiments, the base stations 14 may transmit on multiple beams. In this example, the base stations 14 communicate via an X2 connection or more generally a base-station-to-base-station connection. In addition, the base stations 14 are connected to a core network 20, which includes various core network nodes such as, e.g., one or more Mobility Management Entities (MMEs) 22, one or more Serving Gateways (S-GWs) 24, and one or more Packet Data Network Gateways (P-GWs) 26.

Directly Scheduled HARQ Feedback

In some embodiments, each DCI schedules feedback to be transmitted at a later occasion given an included subframe offset K. A DCI scheduled at subframe T would then render feedback at subframe T+K.

In some related embodiments, the configuration of K could be provided, e.g., partially, by, e.g., a look-up table transmitted via e.g. higher layer signaling and/or hard-coded in the specifications. For example, assuming the minimum possible K being N, which is the reaction time of the wireless device 18, then instead of sending K=N, K=N+1, K=N+2, etc., the network could instead signal S=0, S=1, S=2, etc. in the DCI and then separately signal the value N, whereafter the wireless device 18 will calculate K as K=S+N. Note that, at least in some embodiments, the value of N may be signaled only once, e.g., by higher layer signaling, or may be a property of the wireless device 18 of which the network is already aware from, e.g., an earlier performed RRC connection procedure. The value of S may be varied. For example, the value of S may be varied by including the value of S in each respective DCI message where the value of S may vary from one DCI message to another.

Figure 2:
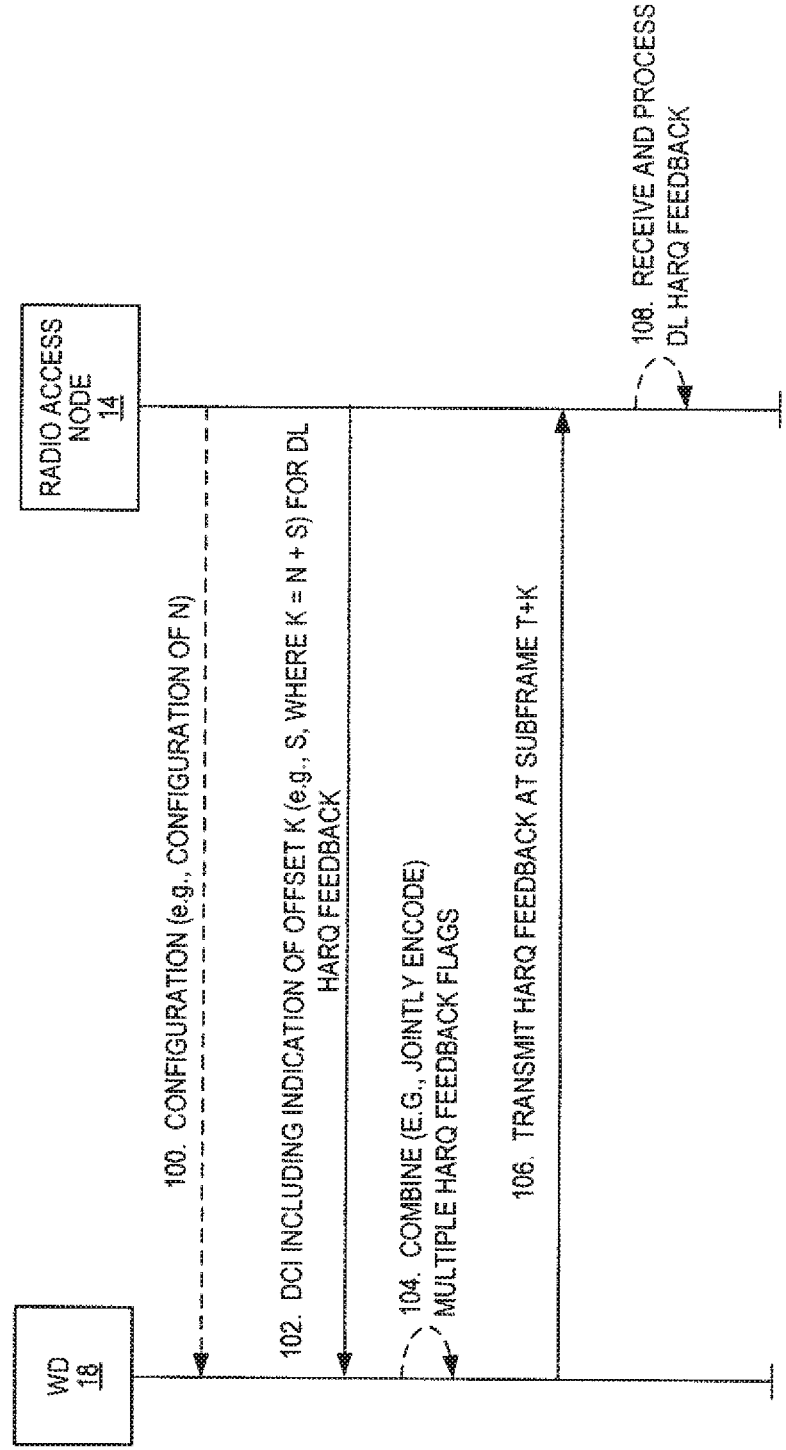
FIG. 2 illustrates the operation of a wireless device (e.g., a User Equipment device (UE)) and a radio access node (or other network node) according to one embodiment of the present disclosure.

FIG. 2 illustrates the operation of a wireless device 18 and a radio access node 14 or other network node to operate according to, e.g., the embodiments above. As illustrated, the radio access node 14 or some other network node optionally configures, at least partially, an offset K to be used to determine the time (T+K) at which the wireless device 18 is to transmit HARQ feedback upon receiving a DCI message (step 100). Again, T is the subframe or more generally the time at which the DCI message is received and T+K is the subframe or more generally the time at which the HARQ feedback is to be transmitted. Thus, T is sometimes referred to herein as the current subframe, and K is referred to herein as the HARQ timing offset K or simply the offset K. As stated above, this configuration of the offset K may include, e.g., signaling of a look-up table to be used by the wireless device 18 to determine the value of K, e.g., from an index transmitted in a corresponding DCI message. As another example discussed above, this configuration may be a configuration of a value S to be used to determine the offset K, e.g., according to K=N+S, where S is included in the corresponding DCI message and N is a predetermined value such as, for example, a predetermined reaction time of the wireless device 18.

At some point, the wireless device 18 receives a DCI message from the radio access node 14, where the DCI message includes an indication of the offset K (step 102). The indication of the offset K may be the value of K or, e.g., some value that can be used by the wireless device 18 to determine the value of K, i.e., K may be a function of a value X communicated by the indication. For example, the indication of the offset K may be a value S, where the offset K=N+S, where N may be predefined e.g. by standard or configured by the network, e.g., provided in the configuration of step 100.

In some embodiments, the wireless device 18 receives a single DCI message and results in the transmission of HARQ feedback in step 106 below that includes a single HARQ flag. However, in other embodiments, the wireless device 18 receives multiple DCI messages including the DCI message of step 102 and additional DCI messages that are potentially in previous subframes. Thus, if there are multiple DCI messages, these DCI messages may have respective HARQ timing offsets K that result in the respective HARQ feedback being transmitted in the same subframe. Thus, in some embodiments, the wireless device 18 combines multiple HARQ feedback flags to provide HARQ feedback to be transmitted by the wireless device at subframe T+K (step 104). Note, however, that step 104 is optional. As discussed below, the manner in which the wireless device 18 combines the multiple feedback flags may vary depending on the particular embodiment/implementation. For example, the wireless device 18 may concatenate bit patterns that represent the multiple HARQ feedback flags or jointly encode the multiple HARQ feedback flags into a single codeword. As one example alternative to combining the HARQ feedback flags, the wireless device 18 may transmit the HARQ feedback flags in separate Uplink Control Information (UCI) messages.

The wireless device 18 transmits the downlink HARQ feedback at subframe T+K (step 106). As described herein, in some embodiments, the HARQ feedback is a downlink HARQ flag for a single downlink data transmission scheduled by the DCI message in subframe T. In this case, the downlink HARQ flag is an ACK if the downlink data scheduled by the DCI message was successfully received by the wireless device 18 in subframe T or a NACK if the downlink data scheduled by the DCI message was not successfully received by the wireless device 18 in subframe T.

In some other embodiments, the HARQ feedback includes downlink HARQ feedback for multiple downlink transmissions. For example, the multiple downlink transmissions may be scheduled by respective DCI messages received in subframes $T_1, T_2, \ldots, T_M$ where the respective HARQ timing offsets $K_1, K_2, \ldots, K_M$ are such that the HARQ feedback for all of these downlink transmissions is to occur in the same subframe i.e., $T_1+K_1=T_2+K_2=\ldots=T_M+K_M$. The HARQ feedback may then include multiple downlink HARQ flags, e.g., mapped to separate physical resources e.g., Resource Elements (REs)) in the xPUCCH e.g., in separate UCI messages. Alternatively, the HARQ feedback may include a single combined feedback provided by step 104 that jointly represents multiple downlink HARQ flags e.g., is the result of jointly encoding multiple downlink HARQ flags into the single codeword or the result of concatenating multiple bit patterns that represent the multiple HARQ flags. In some embodiments, the downlink HARQ flags include ACKs and NACKs, depending on whether respective downlink data transmissions (e.g., data transmission on Physical Downlink Shared Channel (PDSCH)) are successfully received by the wireless device 18. In addition, in some embodiments, the downlink HARQ flags include DTXs i.e., flags representing an error, or failure, in DCI reception if respective DCI messages are not successfully received by the wireless device 18.

The radio access node 14 receives and processes the HARQ feedback according to any desired HARQ feedback processing scheme (step 108). For instance, if a NACK is received, the radio access node 14 retransmits the downlink data.

In some embodiments, the radio access node 14 is able to detect DCI errors, or failures, based on the HARQ feedback. This is referred to herein as DTX or a DCI failure/error. In some embodiments, DTX detection i.e., a DCI failure can be achieved by either:

Having a distinct (explicit) mapping of each received DCI to a given set of physical resources/REs on the xPUCCH. In other words, a number of separate UCI messages are sent using distinct resources but at the same time. If nothing is received by the network at one particular resource/resource element, then this can be interpreted as if the wireless device 18 failed decoding the corresponding DCI.

Explicitly encode DTX as a separate code point in the feedback, e.g. letting 00=ACK, 01=DTX, 11=NACK, . . . .

Joint encoding of multiple HARQ feedbacks. In this case, when the wireless device 18 prepares the xPUCCH transmission, the wireless device 18 combines the feedbacks flags to be transmitted into a single code point that is mapped to a codeword that is transmitted on the xPUCCH. For instance, if up to four feedback flags can be included in the HARQ feedback transmission, the code point could be calculated as $f_1+3f_2+9f_3+27f_4$, where f1 . . . f4 are the feedback flags encoded as ACK=1, NACK=2, and DTX=0. DTX means that no transmission was detected for that flag. Note that multiple HARQ feedbacks may be combined in a similar manner without joint encoding, e.g., each feedback is represented by a few bits, e.g., two bits as in the example in the preceding bullet point, in a HARQ transmission.

Figure 3A:
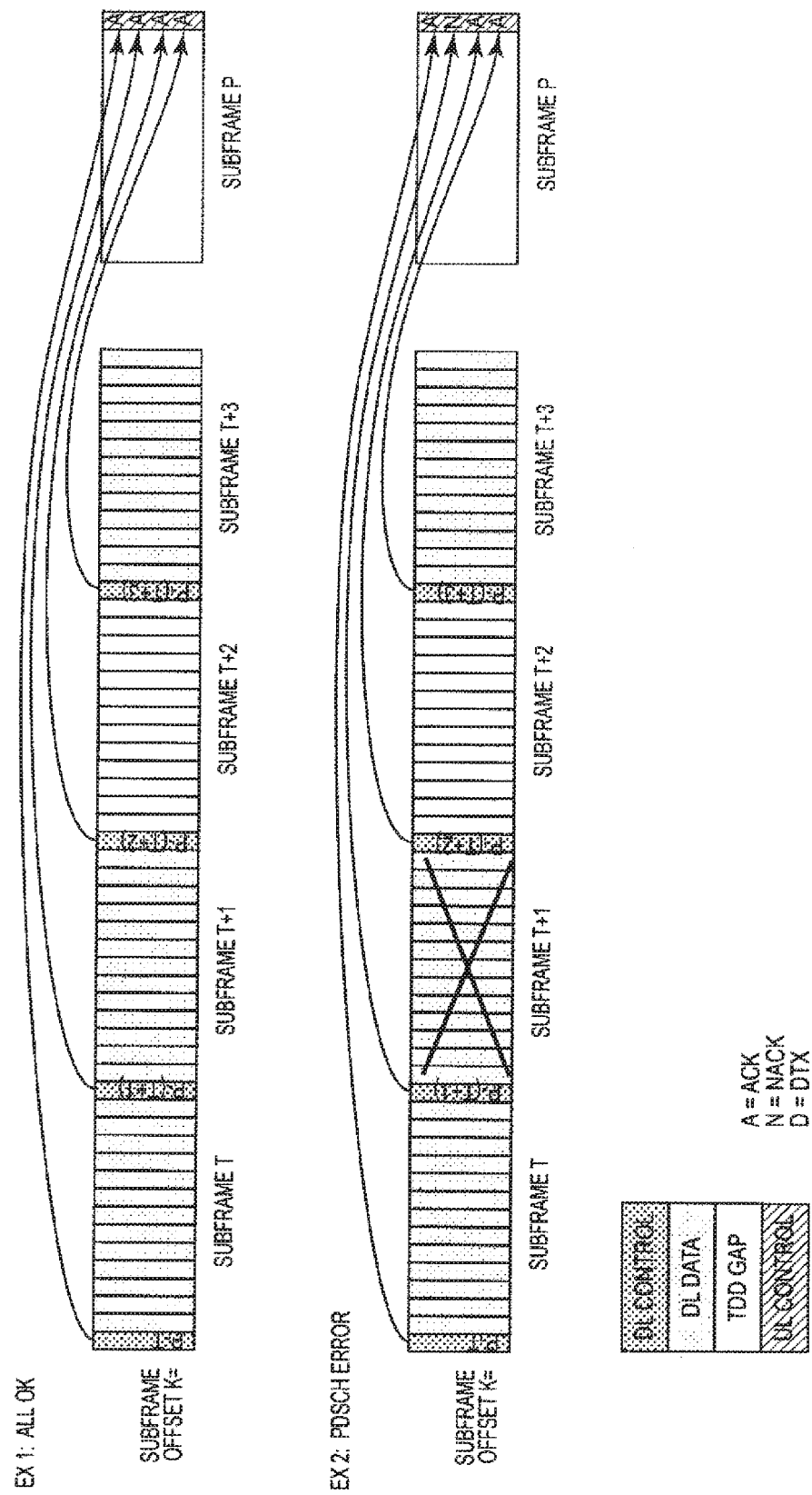
FIGS. 3A and 3B illustrate an exemplification of embodiments of the present disclosure.
Figure 3B:
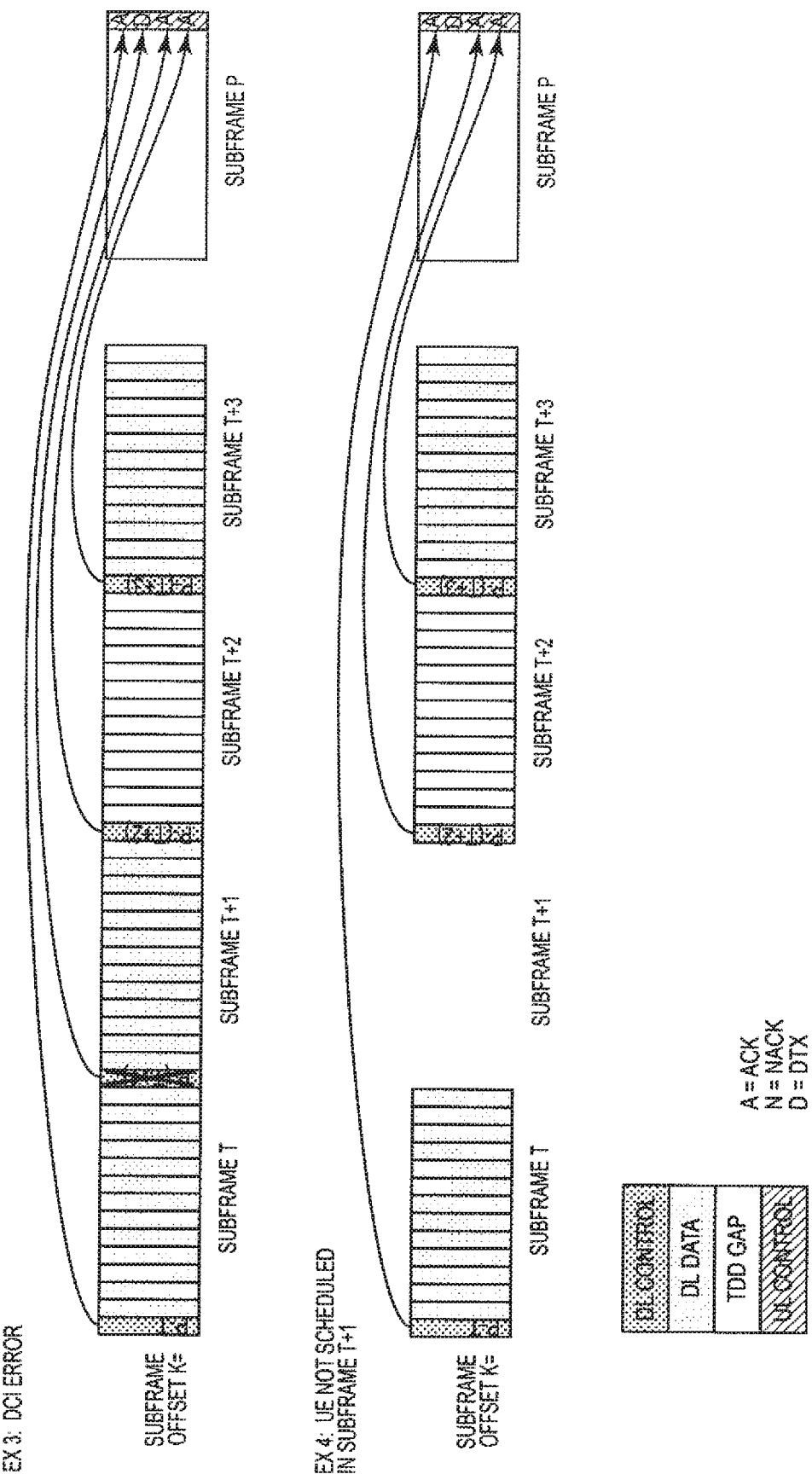

An exemplification of the procedure of FIG. 2 is shown in FIGS. 3A and 3B. In the first example illustrated in FIG. 3A, both the DCI messages and the downlink data are successfully decoded for subframes T, T+1, T+2, and T+3, and HARQ feedback flags, which are ACK, ACK, ACK, and ACK, respectively, are transmitted in subframe P. These four feedback flags may be jointly encoded or otherwise combined into a single feedback/bit pattern or may be transmitted in separate physical resources, e.g., in separate UCI messages. In the second example illustrated in FIG. 3A, DCI messages for subframes T, T+1, T+2, and T+3 are successfully decoded, downlink data for subframes T, T+2, and T+3 are successfully decoded, and downlink data for subframe T+1 is not successfully decoded, i.e., there is a PDSCH error. The appropriate HARQ feedback flags (ACK, NACK, ACK, ACK) are transmitted by the wireless device 18 in subframe P. Again, these four feedback flags may be jointly encoded or otherwise combined into a single feedback/bit pattern or may be transmitted in separate physical resources, e.g., in separate UCI messages.

In the third example illustrated in FIG. 3B, DCI messages for subframes T, T+2, and T+3 are successfully decoded, a DCI message for subframe T+1 is not successfully decoded, i.e., there is an DCI error in subframe T+1, and downlink data for subframes T, T+2, and T+3 are successfully decoded. The appropriate HARQ feedback flags (ACK, DTX, ACK, ACK) are transmitted by the wireless device 18 in subframe P. Again, these four feedback flags may be jointly encoded or otherwise combined into a single feedback/bit pattern or may be transmitted in separate physical resources, e.g., in separate UCI messages. Lastly, in the fourth example illustrated in FIG. 3B, the scenario is the same as in example 1 other than the wireless device 18 is not scheduled in subframe T+1. In this example, the appropriate HARQ feedback flags (ACK, DTX, ACK, ACK) are transmitted by the UE in subframe P. Again, these four feedback flags may be jointly encoded or otherwise combined into a single feedback/bit pattern or may be transmitted in separate physical resources, e.g., in separate UCI messages.

HARQ Feedback by Polling

In some embodiments, each DCI message contains an index to a HARQ feedback buffer, in which the receive status (ACK (A)/NACK (N) or, at least in some embodiments, DTX or DCI error (D)) for the indexed reception is stored.

In some related embodiments, the network will explicitly poll for status reports of the HARQ feedback buffer, something which will also flush the status of the HARQ feedback buffer. Assuming that a HARQ feedback delay of the wireless device 18 is d subframes, a poll being received at subframe T would then render feedback at subframe T+d. In some embodiments, the HARQ feedback delay d may be a static delay, e.g., four subframes. In other embodiments, the HARQ feedback delay d may be a configurable delay. In particular, in some embodiments, the above-mentioned poll could also contain explicit details on when the feedback is to be transmitted in a manner similar to what was described for the configuration of HARQ timing offset K described above. That is, in some embodiments, d=K, where K is the HARQ timing offset K described above.

In yet some further related embodiments, DTX detection, i.e., a DCI failure, can be achieved by either:
  Having a distinct mapping of each HARQ feedback buffer entry to a given set of physical resources/resource elements. If nothing Is received by the network at a particular resource/resource element, then this can be interpreted as if the wireless device 18 failed to decode the corresponding DCI.

Explicitly encode DTX as a separate code point in the feedback.
    Example 1: Letting 00=ACK, 01=DTX, 11=NACK, . . . separately
    Example 2: Joint encoding over all blocks. DTX need only be included in the first three entries since, if DTX on the last entry, no report would be sent. Hence this would require 3*3*3*2=54 code points, which could, e.g., be encoded by an appropriate block code of at least 6 bits, i.e., 2^6=64>54.

Figure 4:
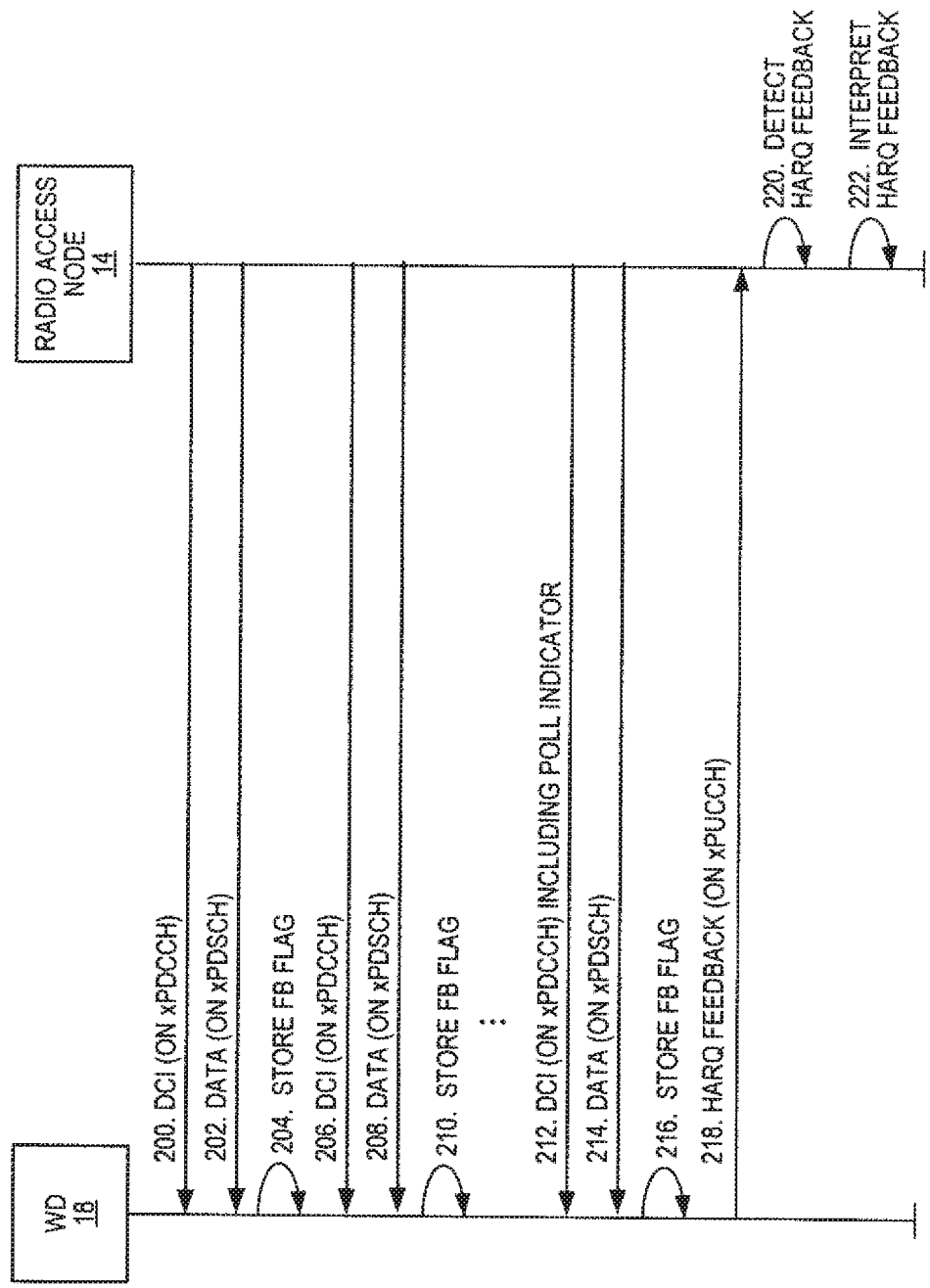
FIG. 4 illustrates the operation of a wireless device and a radio access node (or other network node) according to another embodiment of the present disclosure.

One example of the polling procedure described above is illustrated in FIG. 4. As illustrated, a radio access node 14 transmits, and the wireless device 18 receives, a first DCI message on the downlink control channel, which j is referred to here as x Physical Downlink Control Channel (xPDCCH), in a subframe $T_1$ (step 200). The first DCI message includes a downlink grant that indicates that downlink data is transmitted to the wireless device 18 in the subframe $T_1$. In addition, the first DCI message includes an index to a position in the HARQ feedback buffer at which a respective downlink HARQ flag, e.g., ACK, NACK, or DTX, is to be stored. The radio access node 14 also transmits first downlink data to the wireless device 18 in the subframe $T_1$ in accordance with the downlink grant included in the first DCI message (step 202). The wireless device 18 stores a downlink HARQ flag, which is also referred to herein as a receive status, in the HARQ feedback buffer at the position defined by the index included in the first DCI message (step 204). In some embodiments, the stored downlink HARQ flag is an ACK if the wireless device 18 successfully received/decoded the downlink data in subframe $T_1$ or a NACK if the wireless device 18 did not successfully receive/decode the downlink data in subframe $T_1$. However, this storage scheme may be modified, in some embodiments, as described below. In some embodiments, the HARQ feedback buffer is initialized at all positions to DTX. As such, if the wireless device 18 failed to receive the first DCI message, then a DTX flag is maintained in the respective position in the HARQ feedback buffer.

In the same manner, the radio access node 14 transmits, and the wireless device 18 receives, a second DCI message on the downlink control channel, which is referred to here as xPDCCH, in a subframe $T_2$ (step 206). The second DCI message includes a downlink grant that indicates that downlink data is transmitted to the wireless device 18 in the subframe $T_2$. In addition, the second DCI message includes an index to a position in the HARQ feedback buffer at which a respective downlink HARQ flag, e.g., ACK, NACK, or DTX, is to be stored. The radio access node 14 also transmits second downlink data to the wireless device 18 in the subframe $T_2$ in accordance with the downlink grant included in the second DCI message (step 208). The wireless device 18 stores a downlink HARQ flag, which is also referred to herein as a receive status, in the HARQ feedback buffer at the position defined by the index included in the second DCI message (step 210). In some embodiments, the stored downlink HARQ flag is an ACK if the wireless device 18 successfully received/decoded the downlink data in subframe $T_2$ or a NACK if the wireless device 18 did not successfully receive/decode the downlink data in subframe $T_2$. However, this storage scheme may be modified, in some embodiments, as described below. In some embodiments, the HARQ feedback buffer is initialized at all positions to DTX. As such, if the wireless device 18 failed to receive the second DCI message, then a DTX flag is maintained in the respective position in the HARQ feedback buffer.

The process continues in this manner until the radio access node 14 transmits, and the wireless device 18 receives, a DCI message that contains a poll indicator in subframe $T_M$ (step 212). In this example, this DCI message also includes a downlink grant for subframe $T_M$ and a HARQ buffer index for the corresponding downlink HARQ flag. As such, the radio access node 14 transmits downlink data to the wireless device 18 in the subframe $T_M$ in accordance with the downlink grant included in the DCI message transmitted in subframe $T_M$ (step 214). The wireless device 18 stores a downlink HARQ flag, which is also referred to herein as a receive status, in the HARQ feedback buffer at the position defined by the index included in the DCI message transmitted in subframe $T_M$ (step 216). In some embodiments, the stored downlink HARQ flag is an ACK if the wireless device 18 successfully received/decoded the downlink data in subframe $T_M$ or a NACK if the wireless device 18 did not successfully receive/decode the downlink data in subframe $T_M$. However, this storage scheme may be modified, in some embodiments, as described below. In some embodiments, the HARQ feedback buffer is initialized at all positions to DTX. As such, if the wireless device 18 failed to receive the DCI message in subframe $T_M$, then a DTX flag is maintained in the respective position in the HARQ feedback buffer.

Upon receiving the poll indicator, the wireless device 18 transmits HARQ feedback that represents the HARQ feedback flags stored in the HARQ feedback buffer, e.g., on xPUCCH (step 218). The HARQ feedback is transmitted in subframe $T_M$+d, wherein the delay d may be a static delay or a configurable delay, e.g., the configurable HARQ timing offset K in some embodiments. In some embodiments, the multiple HARQ feedback flags in the HARQ feedback buffer may be transmitted in separate physical resources, e.g., in separate UCI messages. In other embodiments, the multiple HARQ feedback flags are combined to provide a combined HARQ feedback for transmission. The combined HARQ feedback may be a concatenation of bit patterns that represent the multiple HARQ flags. For example, the combined HARQ feedback may be 00000001 if the HARQ flags are ACK=00 and NACK=01 and there are four positions in the HARQ feedback buffer. As another example, the combined HARQ feedback may be a codeword resulting from jointly encoding the multiple HARQ flags.

The radio access node 14 detects the HARQ feedback (step 220) and interprets the HARQ feedback (222). Once the HARQ feedback is detected and interpreted, the radio access node 14 takes an appropriate action(s), e.g., retransmit the data.

Figure 5A:
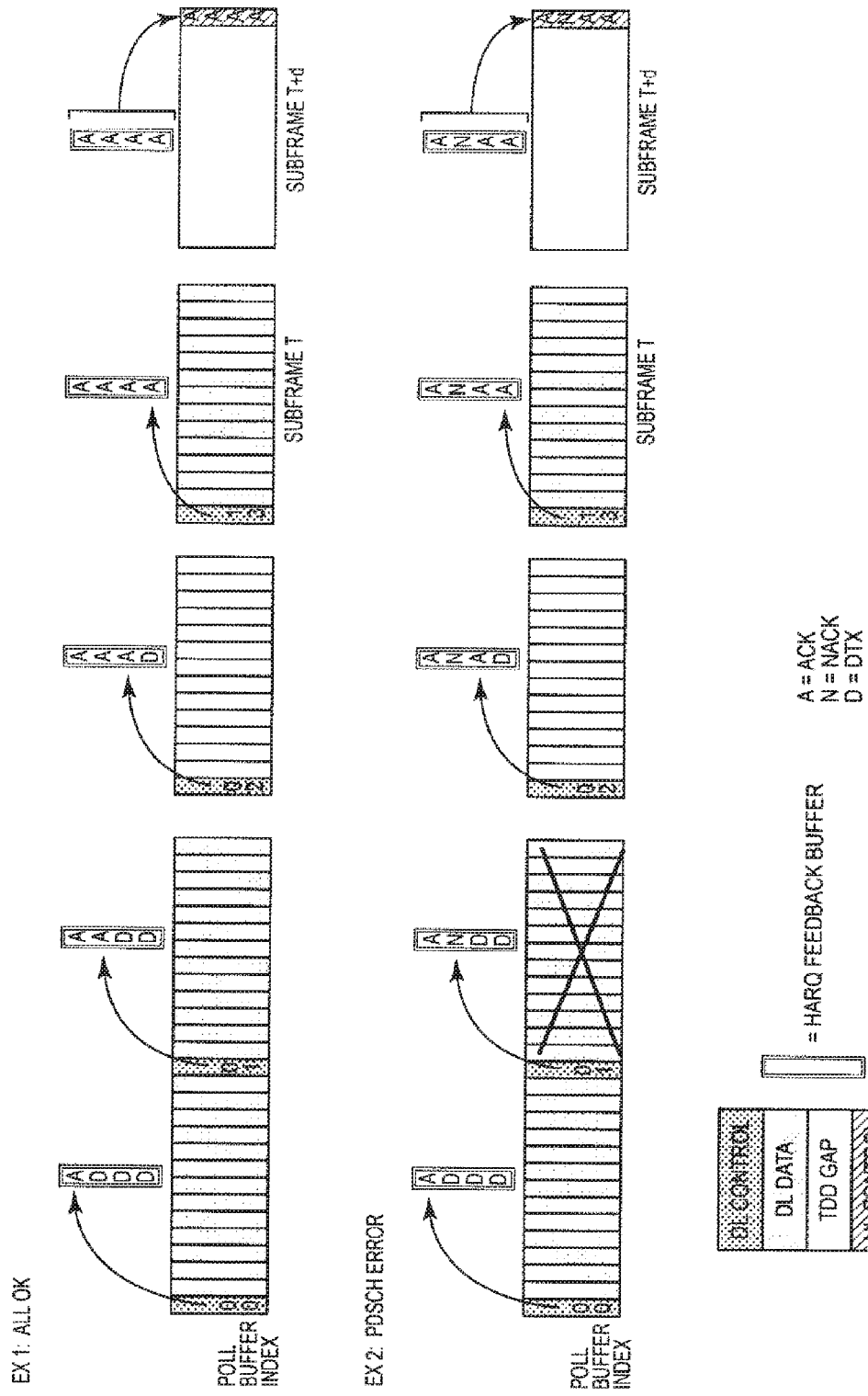
FIGS. 5A and 5B illustrate an exemplification of some other embodiments of the present disclosure.
Figure 5B:
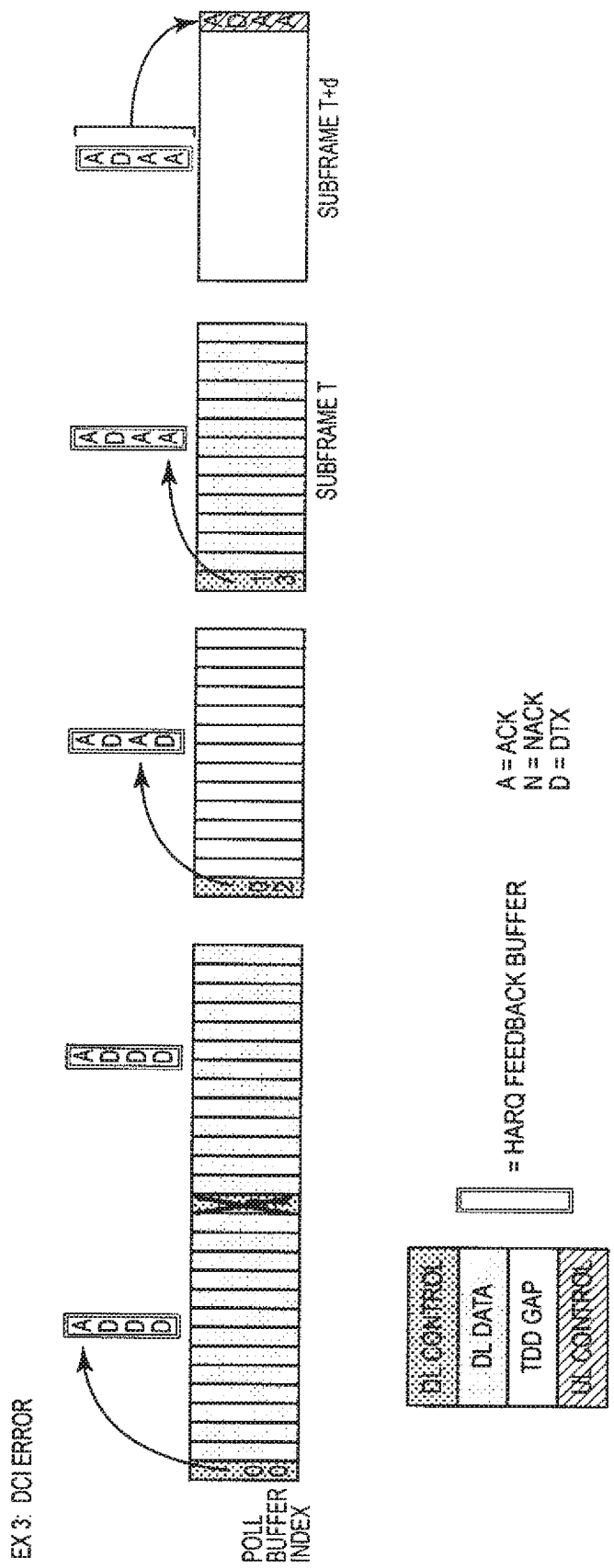
Figure 6:
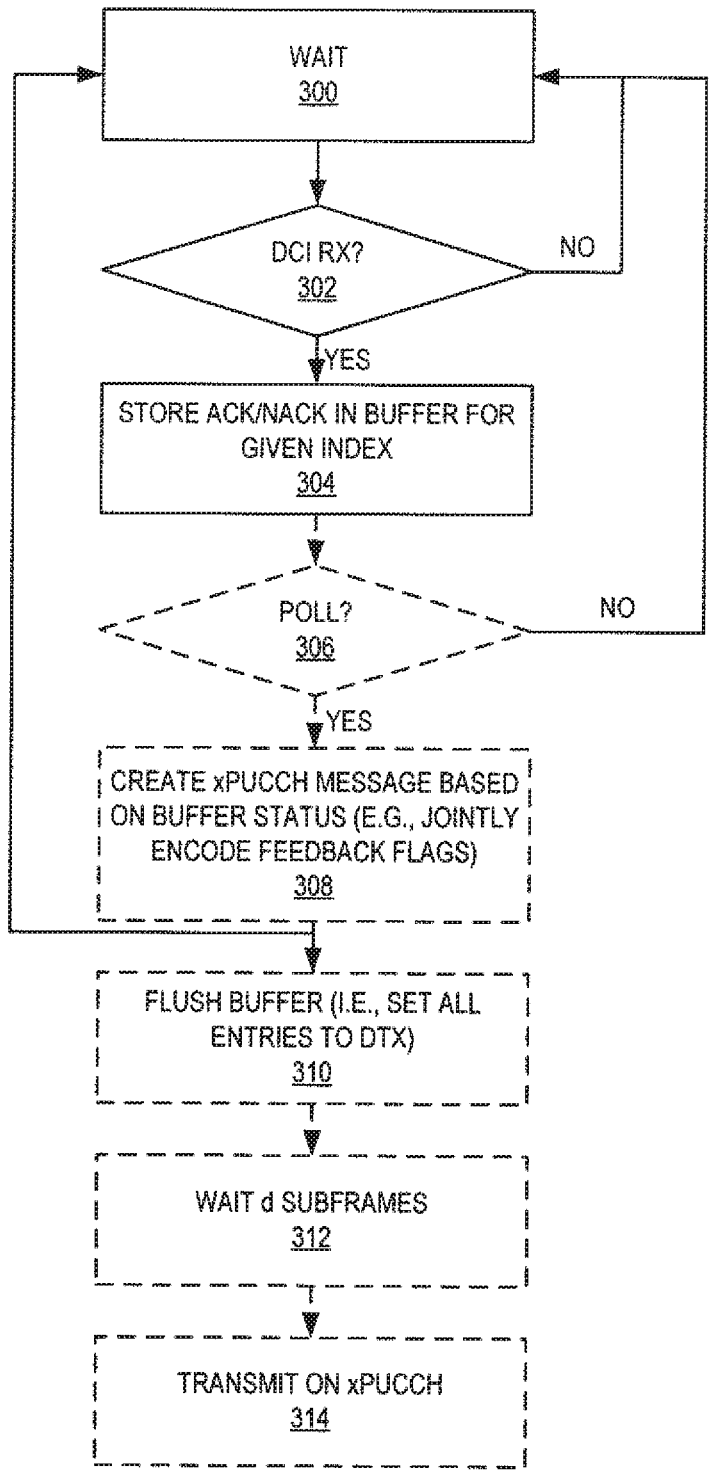
FIG. 6 is a flow chart that illustrates the operation of a wireless device according to some embodiments of the present disclosure.

An exemplification of this procedure is shown in FIGS. 5A and 5B with a corresponding flow chart illustrating the operation of the wireless device 18 in FIG. 6. Note that in FIGS. 5A and 5B, the indexing and polling in the DCI are encoded separately. They could of course be jointly encoded as e.g.:

00=Store feedback with index 0
01=Store feedback with index 1
10=Store feedback with index 2
11=Store feedback with index 3 and transmit feedback/ flush buffer N subframes later As shown in FIG. 5A, in the first example, the wireless device 18 receives a DCI message with buffer index 00 and, as such, stores the respective HARQ feedback flag in the HARQ feedback buffer at the buffer location corresponding to index 00. In the next subframe, the wireless device 18 receives a DCI message with poll buffer index 01 and, as such, stores the respective HARQ feedback flag in the HARQ feedback buffer at the buffer location corresponding to index 01. Later, the wireless device 18 receives another DCI message in subframes with poll buffer indices 02 and 13, respectively, and, as such, stores the respective HARQ feedback flags in the HARQ feedback buffer at the buffer locations corresponding to indices 02 and 13. The network, e.g., the radio access node 14, polls the wireless device 18 for the HARQ feedback. In response to being polled by the network, the wireless device 18 transmits the HARQ feedback stored in the HARQ feedback buffer in subframe T+d, in this example, where the wireless device 18 was polled in, e.g., subframe T and the value d may be a static value or a configurable value, e.g., the HARQ timing offset K, configured by the network as described above. Examples 2 and 3 of FIGS. 5A and 5B are similar to the first example but where there is a PDSCH error in the second subframe (example 2) and a DCI error in the second subframe (example 3).

FIG. 6 is a flow chart that illustrates the operation of a wireless device 18 according to some embodiments of the present disclosure. Note that, in some embodiments, the HARQ feedback buffer is initialized such that all positions are set to some default value, which in the example embodiments described herein is DTX. Note that dashed boxes represent optional steps. As illustrated, the wireless device 18 first waits for reception of a DCI message (steps 300 and 302). Upon receiving a DCI message, the wireless device 18 stores the appropriate HARQ flag, ACK or NACK, in the HARQ feedback buffer for a given index, where the index is, e.g., provided in the DCI message (step 304). The process returns to step 300 and may repeated until the wireless device 18 is polled by the network (step 306, YES). Note that, in some embodiments, step 306 is optional in that, e.g., the wireless device 18 may automatically send feedback upon reaching the final position in the HARQ feedback buffer. This may be considered an implicit polling.

Upon being polled, the wireless device 18 creates an xPUCCH message based on the status of the HARQ feedback buffer (step 308). For example, in some embodiments, the wireless device 18 combines the downlink HARQ flags stored in the HARQ feedback buffer to provide a combined HARQ feedback, i.e., a combined downlink HARQ feedback message. The combined HARQ feedback may be, for example, a concatenation of bit patterns/sequences for each downlink HARQ flag or, as another example, a single codeword resulting from jointly encoding the HARQ flags stored in the HARQ feedback buffer. The xPUCCH message includes, e.g., in an encoded form, the HARQ feedback flags stored in the HARQ feedback buffer. The wireless device 18 flushes the HARQ feedback buffer, e.g., sets all entries to DTX (step 310). The wireless device 18 waits d subframes (step 312) and then transmits the created xPUCCH message on xPUCCH (step 314). Note that the value d, i.e., the HARQ feedback delay, may be a predefined value, e.g., a static value defined by a standard, or a configured value that is configured by the network, e.g., in a manner similar to the configuration of the HARQ timing offset K.

In some embodiments, the HARQ feedback delay d is a device-specific value that is, e.g., defined by a processing delay of the wireless device 18. In this case, different wireless devices 18 may have different device-specific delays from the time that the wireless device 18 receives a DCI message until the time that the wireless device 18 transmits a UCI, or more generally the HARQ feedback, more than one wireless device 18 may transmit UCI messages simultaneously, i.e., in the same subframe. This presents a problem in that the simultaneous transmissions of UCI messages collide. This problem can be solved by any of the following:

- Using explicit signaling to indicate UCI resources for the wireless device 18, rather than the implicit DCI to UCI mapping. This explicit signaling may be signaling of an indication of the value of d to be used by the wireless device 18, e.g., signaling the HARQ offset timing K, as described above.
- Assigning wireless devices 18 that have different processing delays to different frequency resources.
- Scheduling wireless devices 18 with different processing delays on different DCI Control Channel Elements (CCEs).
- Avoid scheduling a new wireless device 18 that will transmit a UCI that will collide with a UCI that will be transmitted by another wireless device 18 that has already been scheduled.

Advanced HARQ Feedback

The HARQ Feedback solutions for xPUCCH in 5G as described above may experience problems when HARQ feedback, e.g., in the form of HARQ feedback reports, are not received due to DCI errors on the downlink and/or due to xPUCCH errors on the uplink.

Figure 7A:
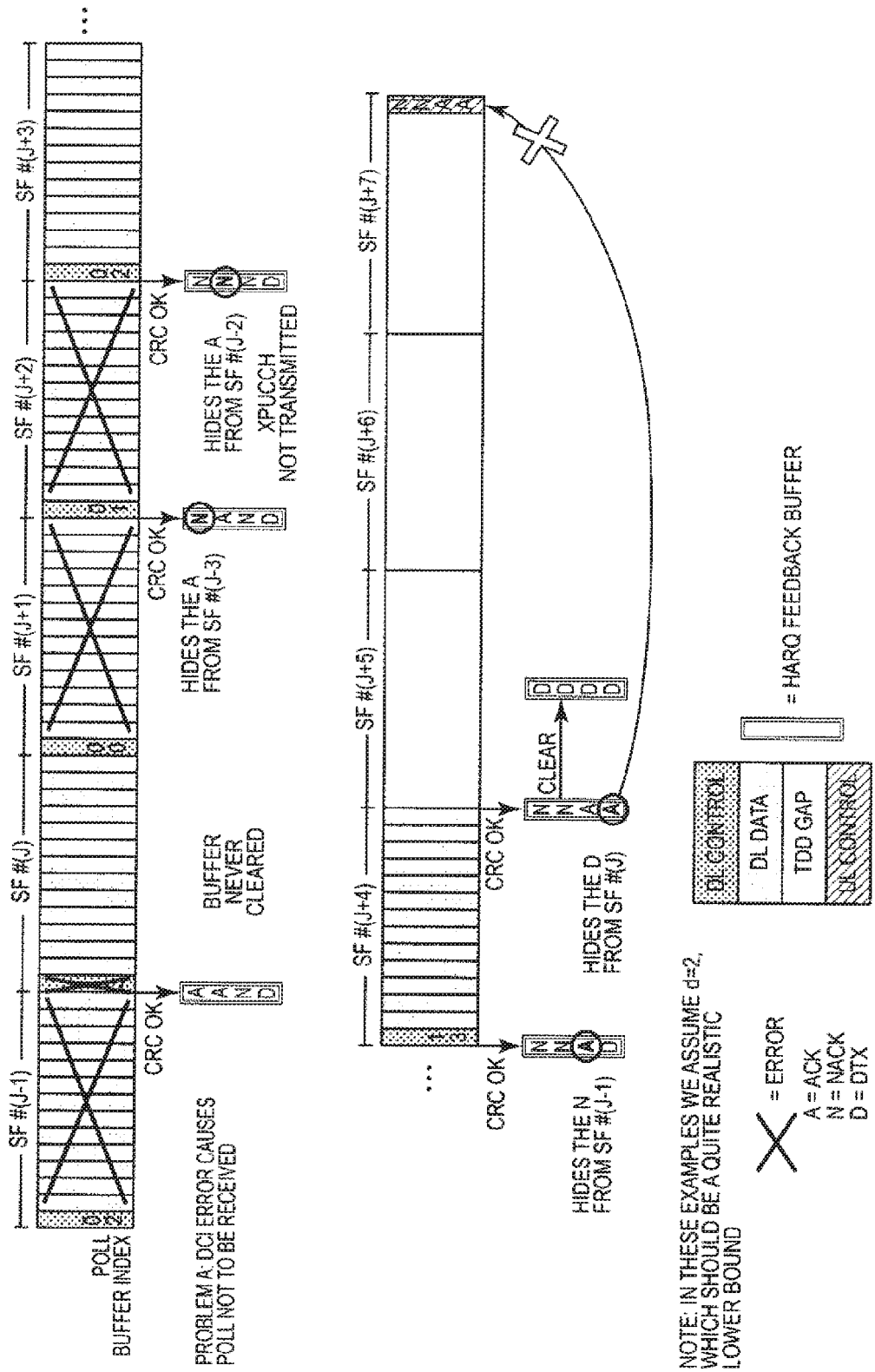
FIGS. 7A and 7B and FIG. 8 illustrate problems relating to bundled Hybrid Automatic Repeat Request (HARQ) feedback in a cellular communications system.
Figure 7B:
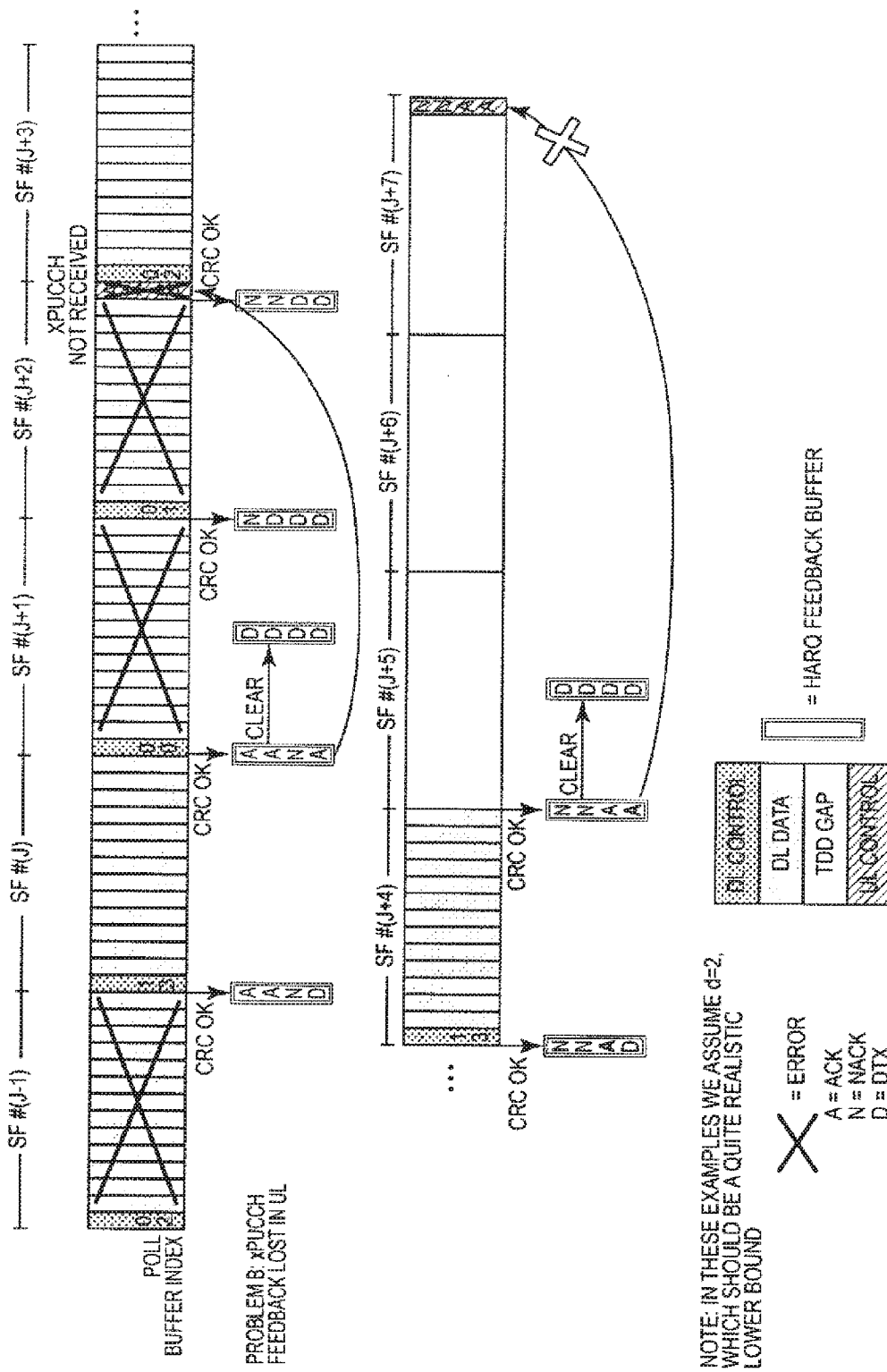
Figure 8:
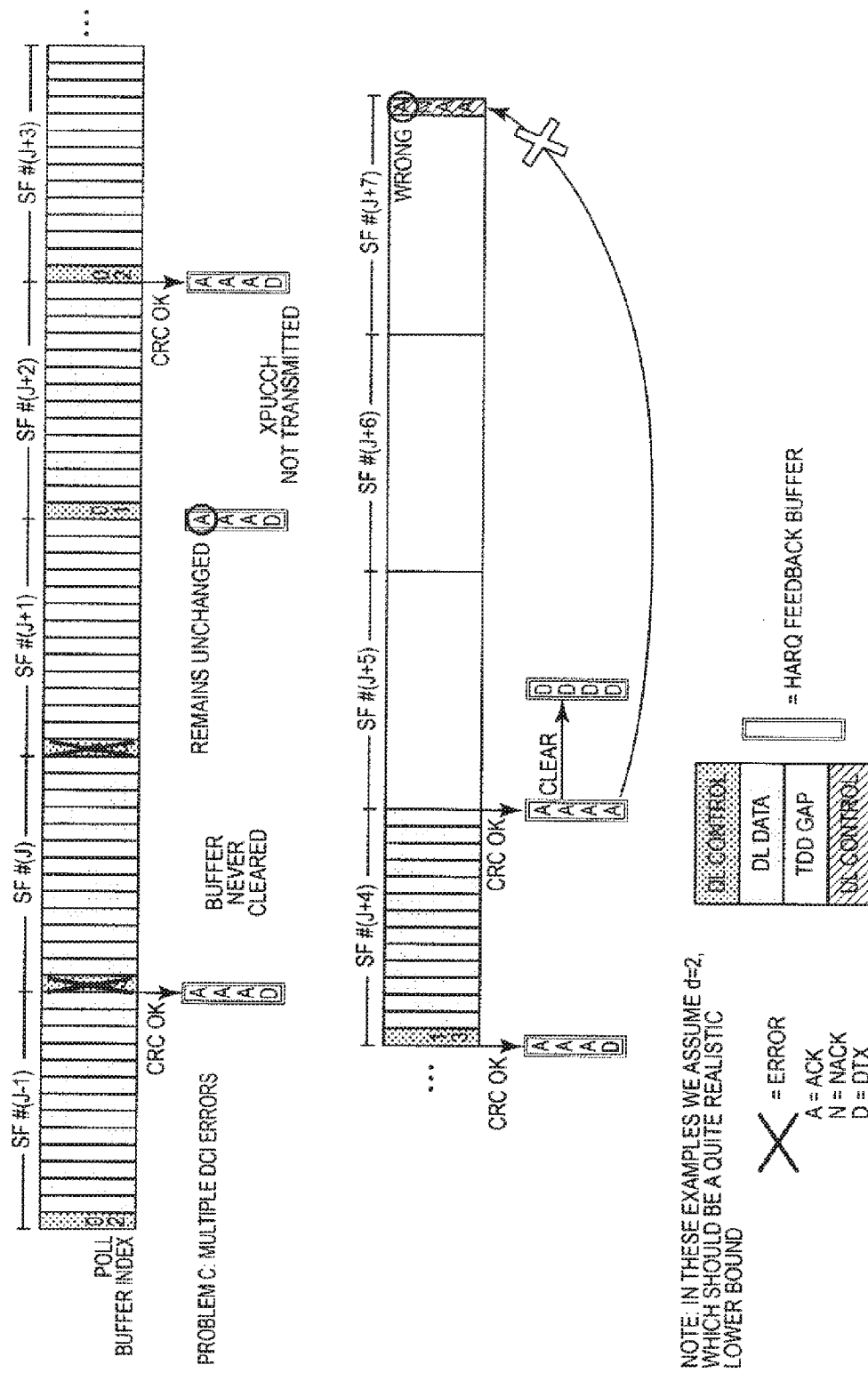

As illustrated in FIGS. 7A and 7B and FIG. 8, in these cases, the network cannot draw any conclusions on the successful and/or unsuccessful reception of the PUSCH transmissions to be covered by the non-received report. Additionally, the network may even draw the wrong conclusions in terms of believing non-received transmissions to be ACK'ed, e.g. NACK→ACK errors, which will cause expensive higher layer retransmissions.

Specifically, FIGS. 7A and 7B illustrate two problems, referred to as Problem A and Problem B. In Problem A, a DCI error causes the poll request/indicator to not be received by the wireless device 18 in subframe SF #(J). Since the poll indictor is not received, the HARQ feedback buffer is not cleared, i.e., all positions in the HARQ feedback buffer are not reset to DTX, and the wireless device 18 does not transmit the HARQ feedback to the network in subframe SF #(J+2). As such, in this example, in subframe SF #(J+1), a NACK is stored in the first position in the HARQ feedback buffer, where the NACK overwrites/hides the ACK in the HARQ feedback buffer that was not transmitted to the network as a result of the DCI error in subframe SF #(J). In subframe SF #(J+2), a NACK is stored in the second position in the HARQ feedback buffer, where the NACK overwrites/hides the ACK in the HARQ feedback buffer that was not transmitted to the network as a result of the DCI error in subframe SF #(J). In subframe SF #(J+3), an ACK is stored in the third position in the HARQ feedback buffer, where the ACK overwrites/hides a NACK in the HARQ feedback buffer that was not transmitted to the network as a result of the DCI error in subframe SF #(J). In subframe SF #(J+4), an ACK is stored in the fourth position in the HARQ feedback buffer, where the ACK overwrites/hides a DTX in the HARQ feedback buffer that was not transmitted to the network as a result of the DCI error in subframe SF #(J). In Problem B, xPUCCH feedback is lost in the uplink such that xPUCCH is not received in subframe SF #(J+2).

Note that the network does not know how to discriminate between Problems A and B. In both Problems A and B, at subframe SF #(J+2), the network will not receive any HARQ feedback for the downlink transmissions in subframes SF #(J−3), SF #(J−2), SF #(J−1), and SF #(J), and the network cannot draw any conclusions with respect to these downlink transmissions. At subframe SF #(J+7), the network will retransmit all HARQ processes being NACK'ed, namely, those of buffer indexes 0 and 1, which correspond to the downlink transmissions of subframes SF #(J+1) and SF #(J+2). The network will similarly assume that the downlink transmissions of subframes SF #(J+3) and SF #(J+4) are ACK'ed. This is all correct, but the network does not know the receive status of the subframes SF #(J−3), SF #(J−2), SF #(J−1), and SF #(J) since the corresponding status flags have been overwritten by the new status flags.

FIG. 8 illustrates a problem (Problem C) that results in a scenario in which there are multiple consecutive DCI errors. In addition to the problems of Problem A of FIG. 7A, for Problem C, the DCI error at subframe SF #(J+1) will cause the entry in the HARQ feedback buffer an index 0 to not be updated. This in turn will cause the network, at subframe SF #(J+7), to erroneously assume that the corresponding downlink transmission has been ACK'ed, whereas in fact it should have been indicated as DTX.

Embodiments of the present disclosure enhance the HARQ feedback solution for xPUCCH in 5G as described above. Note that the term xPUCCH is used herein to refer to the uplink control channel, particularly in a 5G network. However, the name xPUCCH is only used for clarity and ease of discussion and the actual uplink control channel in 5G may be given a different name. An overview of the present disclosure is outlined in FIG. 9, which is described below. Most importantly, embodiments of the present disclosure:

- ensure that the wireless device 18 not simply replaces the old status (ACK/NACK/DTX) of an earlier reception with the new, but uses a more sophisticated procedure (see FIG. 11 and corresponding description below); and
- ensure that the network interprets the lack of feedback correctly (DCI error or xPUCCH error) and takes appropriate actions in response thereto (see FIG. 12 and the corresponding description below).

With the enhancements disclosed herein, the HARQ feedback solution described above is made more robust against control channel errors in the downlink, i.e., DCI errors, as well as in the uplink, i.e., xPUCCH errors. It assures that costly DTX/NACK→ACK errors, which will trigger higher layer retransmissions, are alleviated at the cost of some extra HARQ retransmissions, which are not costly. As an extra bonus, it implicitly interprets lack of HARQ feedback as fast as possible, hence providing the shortest possible HARQ Round Trip Time (RTT).

The details of embodiments of the enhanced HARQ feedback solution are to a large extent provided by the flow charts of FIGS. 9 through 13. The following parts of this section provide some more elaborations and possible embodiments for these figures. Further, illustrations of the present disclosure in use are shown in the examples of FIGS. 14A through 14C, 15A through 15C, 16A and 16B, 17A and 17B, and 18A and 18B.

Note that the following discussion is focused around the polled HARQ feedback solution since that is most complicated; however, the enhancements could also be applied to the directly scheduled HARQ feedback solutions, as noted in the text below.

Figure 9:
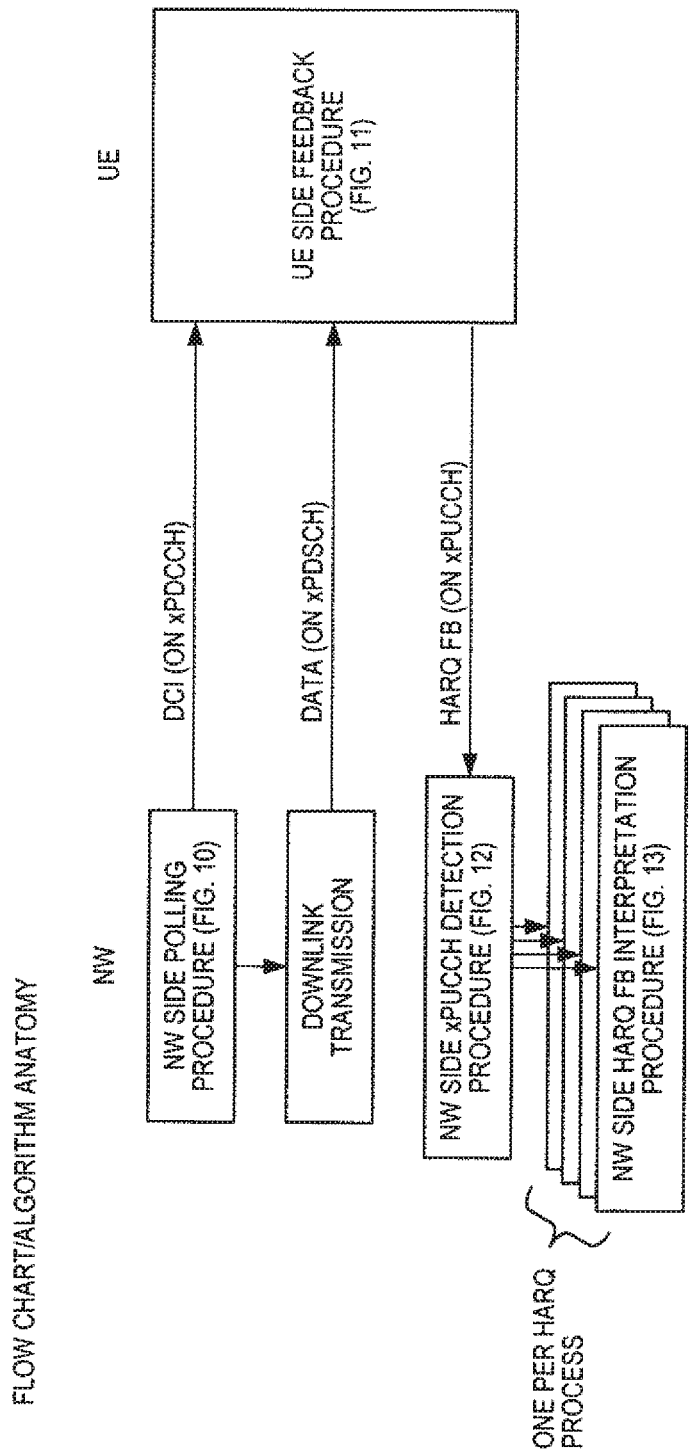
FIG. 9 illustrates the operation of a wireless device and a network node according some embodiments of the present disclosure.

FIG. 9 illustrates an overview/algorithm anatomy for the overall HARQ feedback process. In particular, FIG. 9 illustrates how the individual processes of FIGS. 10 through 13, 14A through 14C, 15A through 15C, and 16A and 16B work together. As illustrated, the network, e.g., the radio access node 14, transmits DCI messages on the control channel, which is referred to as xPDCCH, and also transmits downlink data on the downlink shared channel, which is referred to as xPDSCH. At the UE/wireless device 18, the wireless device 18 performs a UE side feedback procedure that results in the transmission of HARQ feedback to the network. At the network side, network side HARQ feedback interpretation procedures are performed, one per HARQ process, to interpret the HARQ feedback from the wireless device 18 and take the appropriate action(s).

Figure 10:
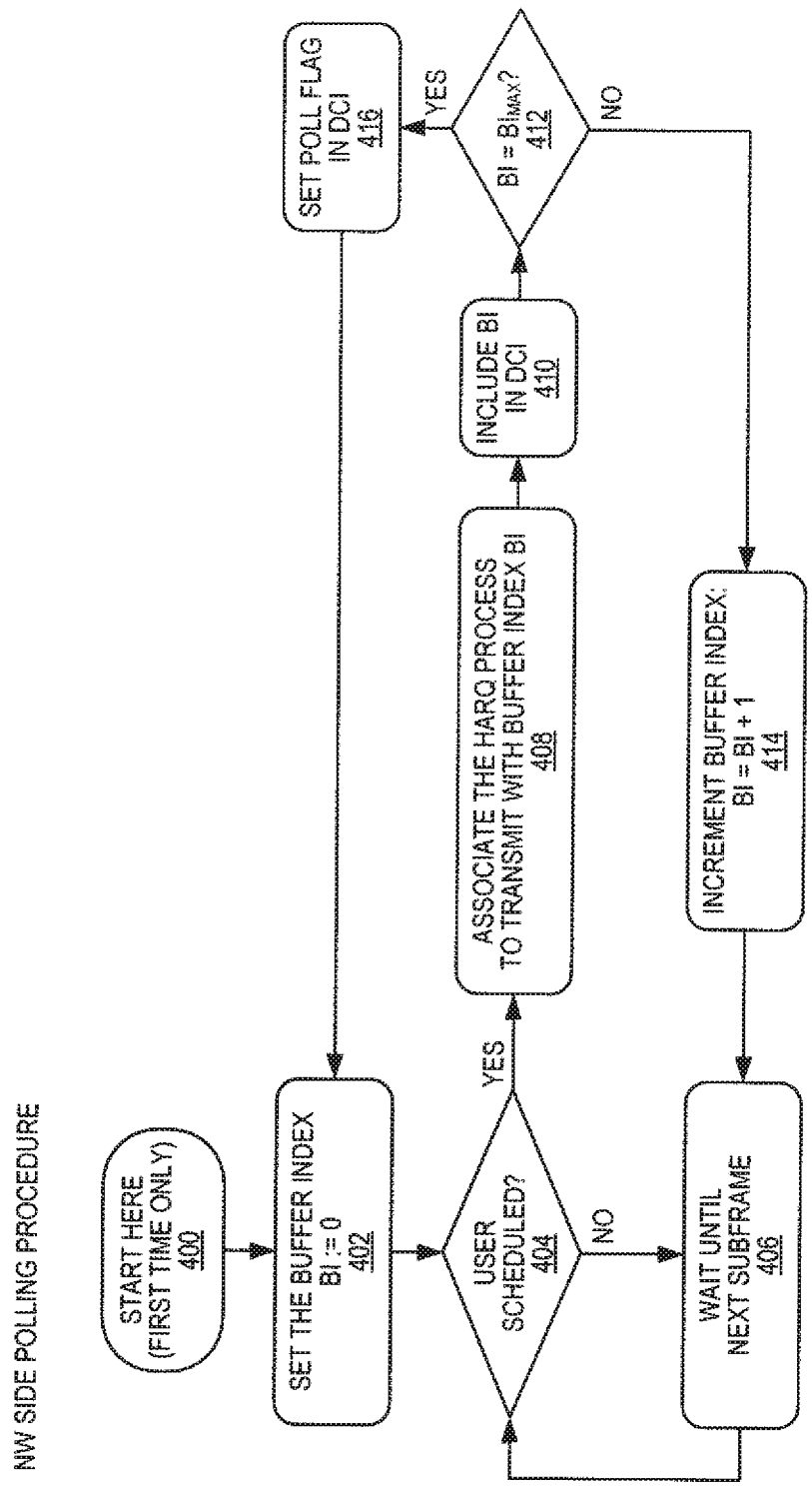
FIG. 10 is a flow chart that Illustrates a polling procedure performed by a network node according to some embodiments of the present disclosure.

FIG. 10 is a flow chart that illustrates a network side polling procedure according to some embodiments of the present disclosure. In some embodiments, the network side polling procedure is performed by the radio access node 14. The network will ensure that for each xPDSCH transmission, the scheduled HARQ process is associated with a locally unique Buffer Index (BI), which is also indicated in the DCI. The BI is the index for the HARQ feedback buffer at the wireless device 18 that defines the position within the HARQ feedback buffer in which the corresponding HARQ flag is to be stored. After performing $BI_{MAX}$ such transmissions, the poll bit is set in the DCI. $BI_{MAX}$ here corresponds to the size of the HARQ feedback buffer at the wireless device 18. Note that xPDSCH is used herein as the name for the PDSCH in a 5G network for clarify and ease of discussion. However, the actual name for the downlink shared channel in a 5G network may be given another name. In some embodiments, $BI_{MAX}$ is given a predetermined value by, e.g., the relevant specification, whereas in other embodiments it can be statically or semi-statically configured by, e.g., higher layer, signaling. In yet other embodiments it can be dynamically set in the DCI. Note that for the "Directly scheduled" case described above, the polling part may obviously be omitted.

In particular, as illustrated, the procedure begins at step 400, and the BI is set to 0 (step 402). The radio access node 14 determines whether a downlink data transmission is scheduled for the wireless device 18, which is referred to as the user, for the current subframe (step 404). If not, the radio access node 14 waits until the next subframe (step 406) and then the process returns to step 404. If a downlink data transmission is scheduled for the wireless device 18 (step 404; YES), the radio access node 14 associates the respective HARQ process to transmit with the current BI (step 408) and includes the BI in the respective DCI message transmitted to the wireless device 18 with the downlink grant (step 410). The radio access node 14 determines whether the BI is equal to $BI_{MAX}$ (step 412). If not, the BI is incremented (step 414) and the process proceeds to step 406. Once the BI reaches $BI_{MAX}$ (step 412; YES), the radio access node 14 sets the poll flag/indicator in the DCI message to be transmitted to the wireless device 18 (step 416) and the process then returns to step 402.

Figure 11:
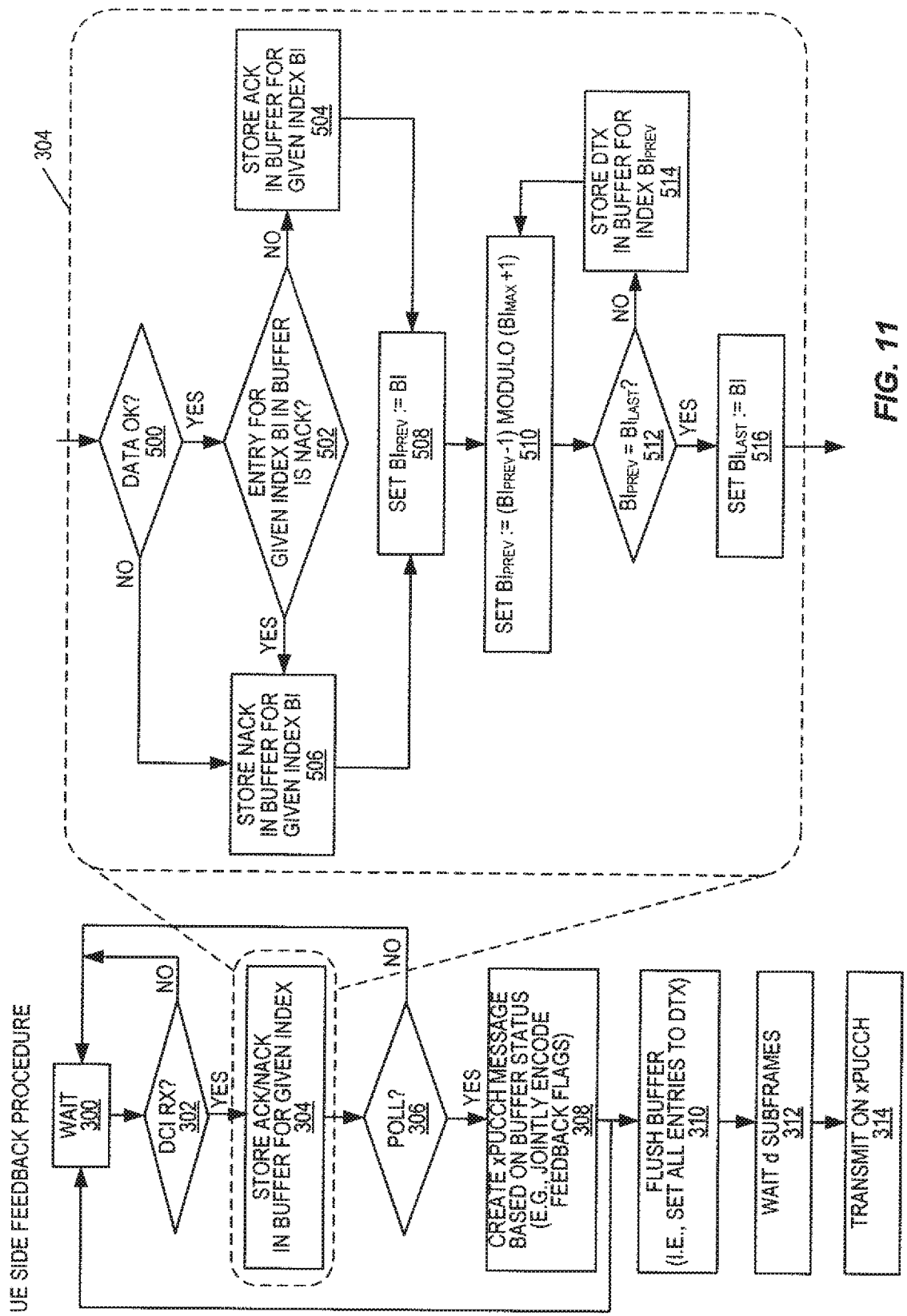
FIG. 11 is a flow chart that illustrates a UE side feedback procedure according to some embodiments of the present disclosure.

FIG. 11 illustrates a UE-side, or wireless device side, feedback procedure according to some embodiments of the present disclosure. This process is that same as that of FIG. 6, but provides enhancements for the storing step 304. In general, the feedback procedure relates to when the wireless device 18 manages to decode at least the DCI message indicating the xPDSCH transmission—and possibly also the xPDSCH transmission itself. As said earlier, the DCI message includes a BI as well as a poll indicator (which may be in the form of, e.g., a poll bit). The wireless device 18 maintains a HARQ feedback buffer in which the reception status (ACK/NACK/DTX) is stored. The HARQ feedback buffer is typically flushed, i.e., all entries are reset to DTX, after each poll. Each entry in the HARQ feedback buffer is indexed with the earlier described BI.

In this embodiment, rather than simply replacing the old receive status, which is also referred to herein as HARQ flag, of an earlier reception in the HARQ feedback buffer with the receive status of the current reception, the wireless device 18 instead uses an enhanced storing procedure that will allow the network to later make better and more enlightened interpretations of the HARQ feedback when received. This is important in the cases with DCI errors, wherein the HARQ feedback buffer has not been flushed from the poll, since the poll indicator was not received.

In some embodiments, an already stored NACK in one entry of the HARQ feedback buffer will be kept even though the current reception corresponding to this buffer entry, i.e., the same BI, is successful and hence would indicate an ACK. A stored ACK will however always, for robustness, be overwritten by a NACK if the current reception corresponding to this buffer entry, i.e., the same BI, is unsuccessful. An example of usage is given in Example 8 of FIG. 16B.

In some other embodiments, the stored value of the previous buffer entry (which has its buffer index given by the expression (BI−1) modulo ($BI_{MAX}$+1)) is replaced with DTX in case that buffer index was not indicated in the previous DCI. This could happen in the case when there is a DCI error for that very transmission. This implicit DTX marking will, e.g., prevent error propagation in terms of, most importantly, NACK→ACK errors. An example of usage is given in Example 9 of FIGS. 17A and 17B.

Again, note that for the directly scheduled HARQ feedback solutions described above, the polling part may obviously be omitted, otherwise the rest should be applicable.

As illustrated in FIG. 11, the enhanced storing process is as follows. Upon receiving a DCI message (step 302, YES), the wireless device 18 determines whether the respective downlink data has been successfully received (step 500). If so, the wireless device 18 determines whether the entry in the HARQ feedback buffer for the BI included in the DCI message is a NACK (step 502). If not, the wireless device 18 stores an ACK in the position/entry in the HARQ feedback buffer indicated by the BI included in the received DCI message (step 504). Conversely, if the entry in the HARQ feedback buffer for the BI included in the received DCI message is a NACK, the wireless device 18 stores a NACK, or otherwise maintains the NACK, in the entry in the HARQ feedback buffer for the BI included in the received DCI message (step 506). In this manner, the previous NACK is not hidden or overwritten by an ACK. Returning to step 500, if the downlink data was not successfully received by the wireless device 18, the wireless device 18 stores a NACK in the HARQ feedback buffer at the position/entry indicated by the BI included in the DCI message (step 506).

Optionally, the process may continue in order to detect a previous DCI error. In this regard, whether proceeding from step 504 or 506, the wireless device 18 sets $BI_{PREV}$=BI (step 508) and then sets $BI_{PREV}$=($BI_{PREV}$−1) modulo ($BI_{MAX}$+1) (step 510). Step 510 sets the index $BI_{PREV}$ to the previous index in the sequence of possible BI values {0, 1, . . . , $BI_{MAX}$}. Also, note that the equation given in step 510 assumes that the BI is an unsigned integer. If a signed integer is used, then the equation becomes $BI_{PREV}$=($BI_{PREV}$+$BI_{MAX}$) modulo ($BI_{MAX}$+1). The wireless device 18 then compares $BI_{PREV}$ to $BI_{LAST}$, where $BI_{LAST}$ is the BI included in the most recent previously, successfully, received DCI message. So, if $BI_{PREV}$ is not equal to $BI_{LAST}$, then this means that there was a previous DCI error. Thus, if $BI_{PREV}$ is not equal to $BI_{LAST}$, then the wireless device 18 stores DTX in the HARQ feedback buffer at the position defined by $BI_{PREV}$ (step 514) and the process returns to step 510. Note that if there were multiple consecutive DCI errors, then this process will detect those DCI errors and store DTX in the respective HARQ feedback buffer positions. Once $BI_{PREV}=BI_{LAST}$, meaning that there are no more DCI errors, the wireless device 18 sets $BI_{LAST}$ to BI (step 516). The process then proceeds to step 306, as described above with respect to FIG. 6.

Figure 12:
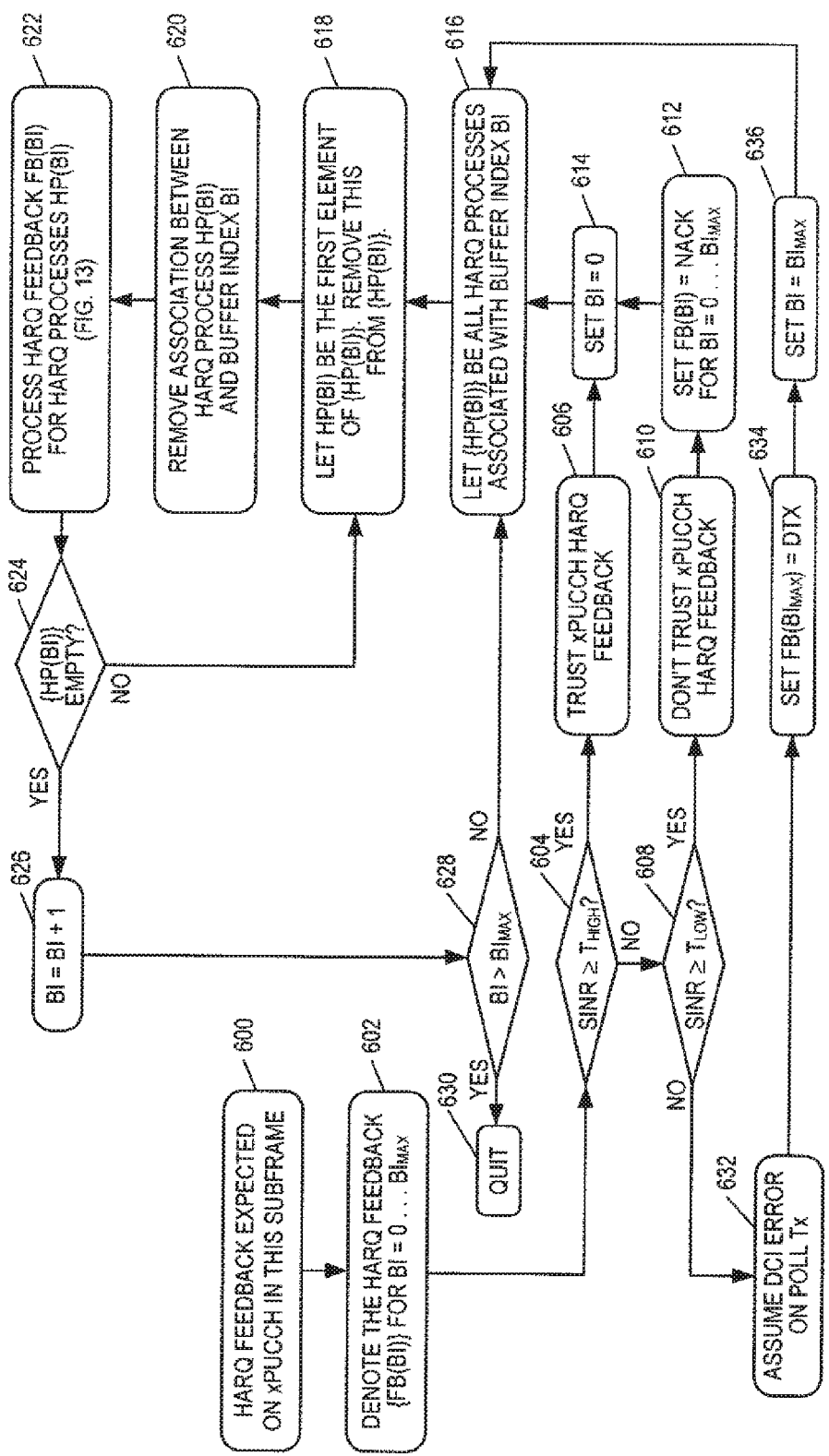
FIG. 12 is a flow chart that illustrates a network side x Physical Uplink Control Channel (xPUCCH) detection procedure according to some embodiments of the present disclosure.

FIG. 12 is a flow chart that illustrates the network side xPUCCH detection procedure according to some embodiments of the present disclosure. This procedure is performed by a network node, e.g., the radio access node 14. Here, the network, e.g., the radio access node 14, is expecting HARQ feedback on xPUCCH during the given subframe (step 600). The HARQ feedback is denoted as {FB(BI)} for BI=0, . . . , $BI_{MAX}$ (step 602). In some embodiments, if the Signal to Interference plus Noise Ratio (SINR) for the xPUCCH reception is above a given threshold $T_{HIGH}$ (which can be a parameter set by, e.g., higher layers) (step 604, YES), the HARQ feedback is deemed trustworthy (step 606). See any example of FIGS. 14A through 14C, 15A through 15C, 16A and 16B, 17A and 17B, and 18A and 18B for illustration.

In some embodiments, when the SINR for the xPUCCH reception is below the threshold $T_{HIGH}$ but above another threshold $T_{LOW}$, which also can be a parameter set by, e.g., higher layers (step 608, YES), then the HARQ feedback received is deemed not trustworthy (step 610). In such cases all considered transmissions are NACK'ed (step 612), i.e. the HARQ feedback for all BIs in this report are set to NACK. This will indeed cost some extra HARQ retransmissions, but will avoid the more costly higher layer retransmission resulting from a premature freeing of the considered HARQ process because of a NACK/DTX→ACK error. For illustrations of this, see Examples 10 and 11 in FIGS. 18A and 18B, respectively.

For both above embodiments, the network sets BI=0 (step 614), and the network will then continue to, for each BI covered by the report (i.e., BI=0 . . . $BI_{MAX}$), process the HARQ feedback for that particular BI for each HARQ process associated with that BI (steps 616-630). In particular, let {HP(BI)} be all HARQ processes associated with the BI (step 616). Let HP(BI) be the first element of {HP(BI)} and remove this element from {HP(BI)} (step 618). The network removes the association between HARQ process HP(BI) and BI (step 620). The network then processes the HARQ feedback FB(BI) for HARQ processes HP(BI) (step 622). This HARQ feedback processing is detailed in FIG. 12. The network determines whether {HP(BI)} is empty (step 624). If not, the process returns to step 618. Once {HP(BI)} is empty, BI is incremented (step 626). At this point, if BI is greater than $BI_{MAX}$ (step 628), the process ends (step 630); otherwise, the process returns to step 616 and is repeated for this new BI.

Returning to step 608, in yet some other embodiments, when the SINR for the xPUCCH reception is below the threshold $T_{LOW}$ (step 608, NO), the network will conclude that the wireless device 18 never tried to transmit any xPUCCH feedback and, hence, that there was a DCI error in the corresponding poll (step 632). The network will then implicitly assume the HARQ feedback for the related xPDSCH transmission to be DTX (with $BI=BI_{MAX}$) since this cannot have been received by the wireless device 18 (step 634). The network then sets $BI=BI_{MAX}$ (step 636) and the process proceeds to step 616 for immediate processing of this implicit DTX feedback. For illustrations of this, see Examples 7, 8, and 9 in FIGS. 16A, 16B, 17A, and 17B.

Figure 13:
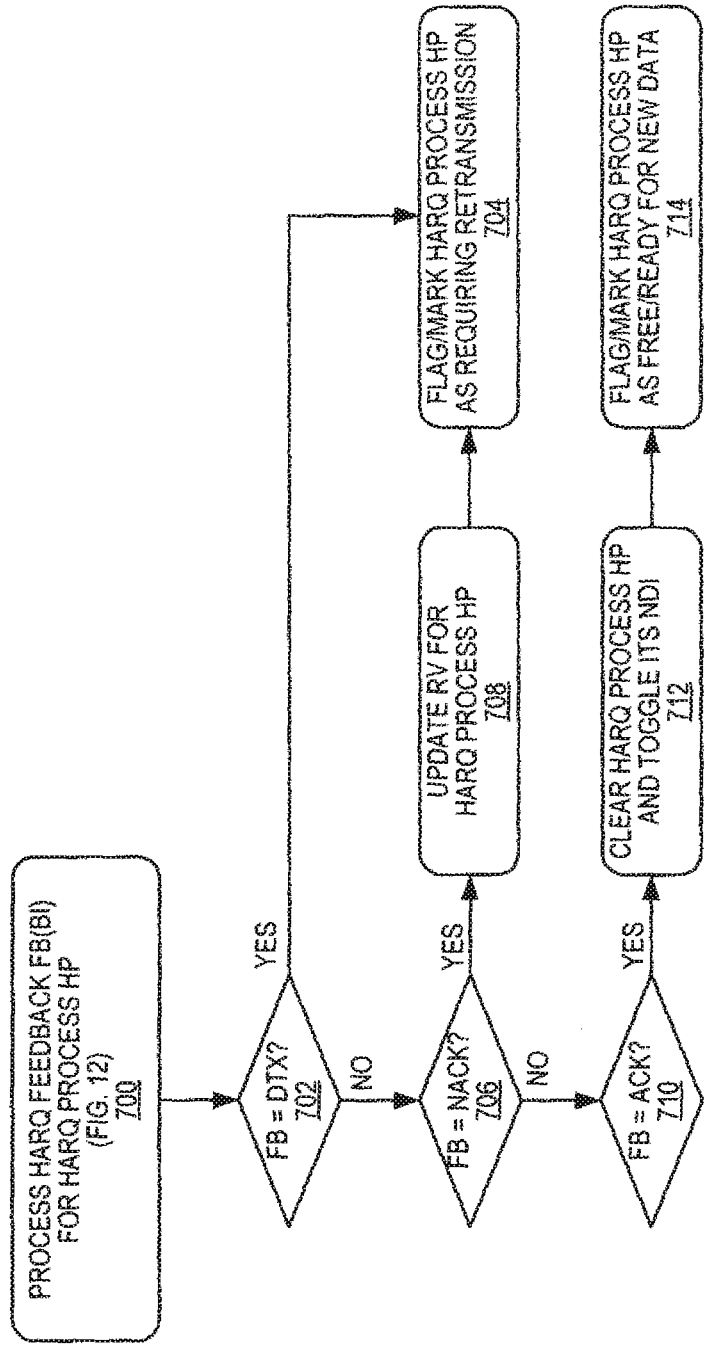
FIG. 13 is a flow chart that illustrates a network side HARQ feedback interpretation procedure according to some embodiments of the present disclosure.
Figure 14A:
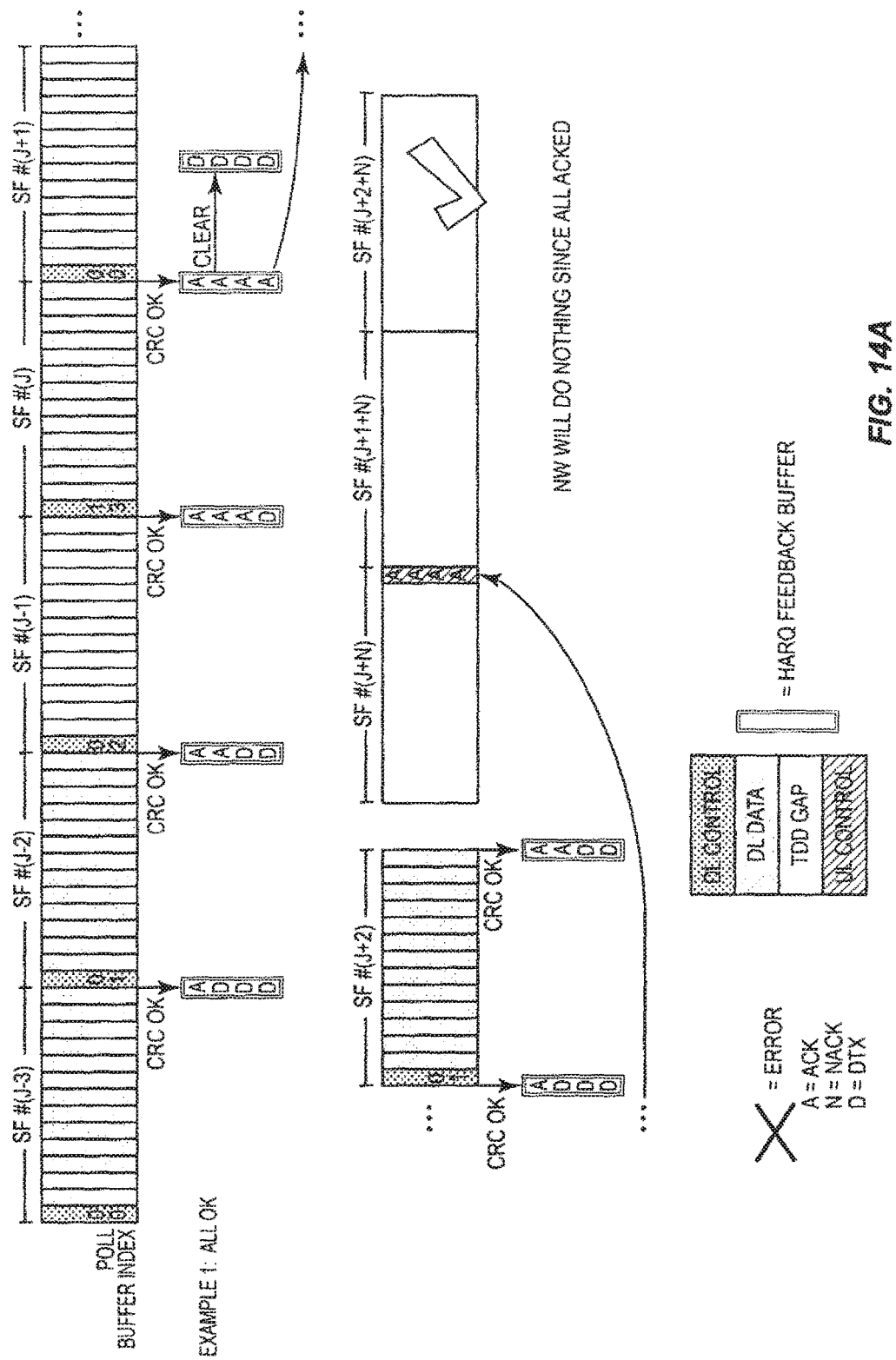
FIGS. 14A through 14C, 15A through 15C, 16A and 16B, 17A and 17B, and 18A and 18B illustrate examples according to various embodiments of the present disclosure.
Figure 14B:
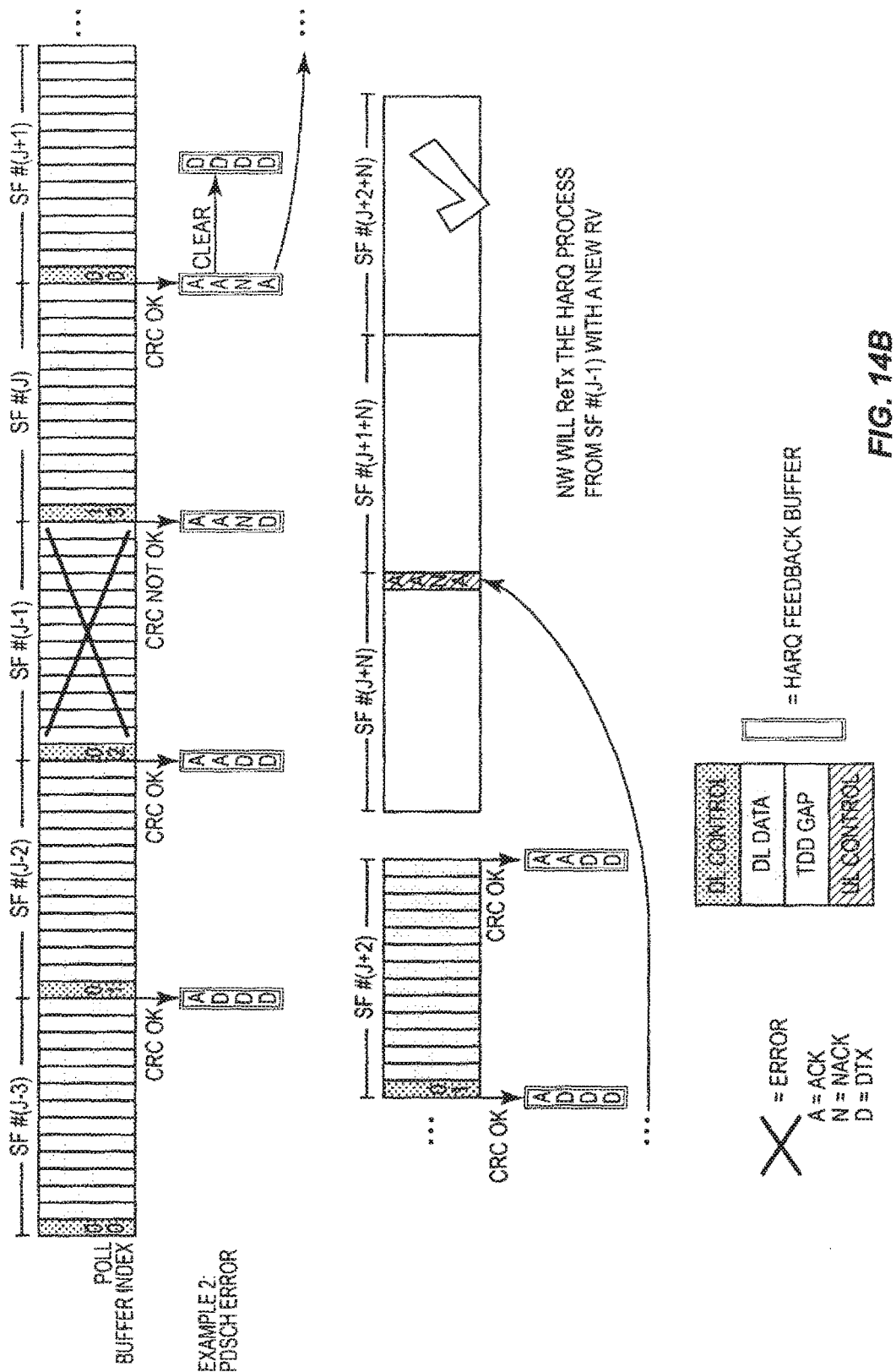
Figure 14C:
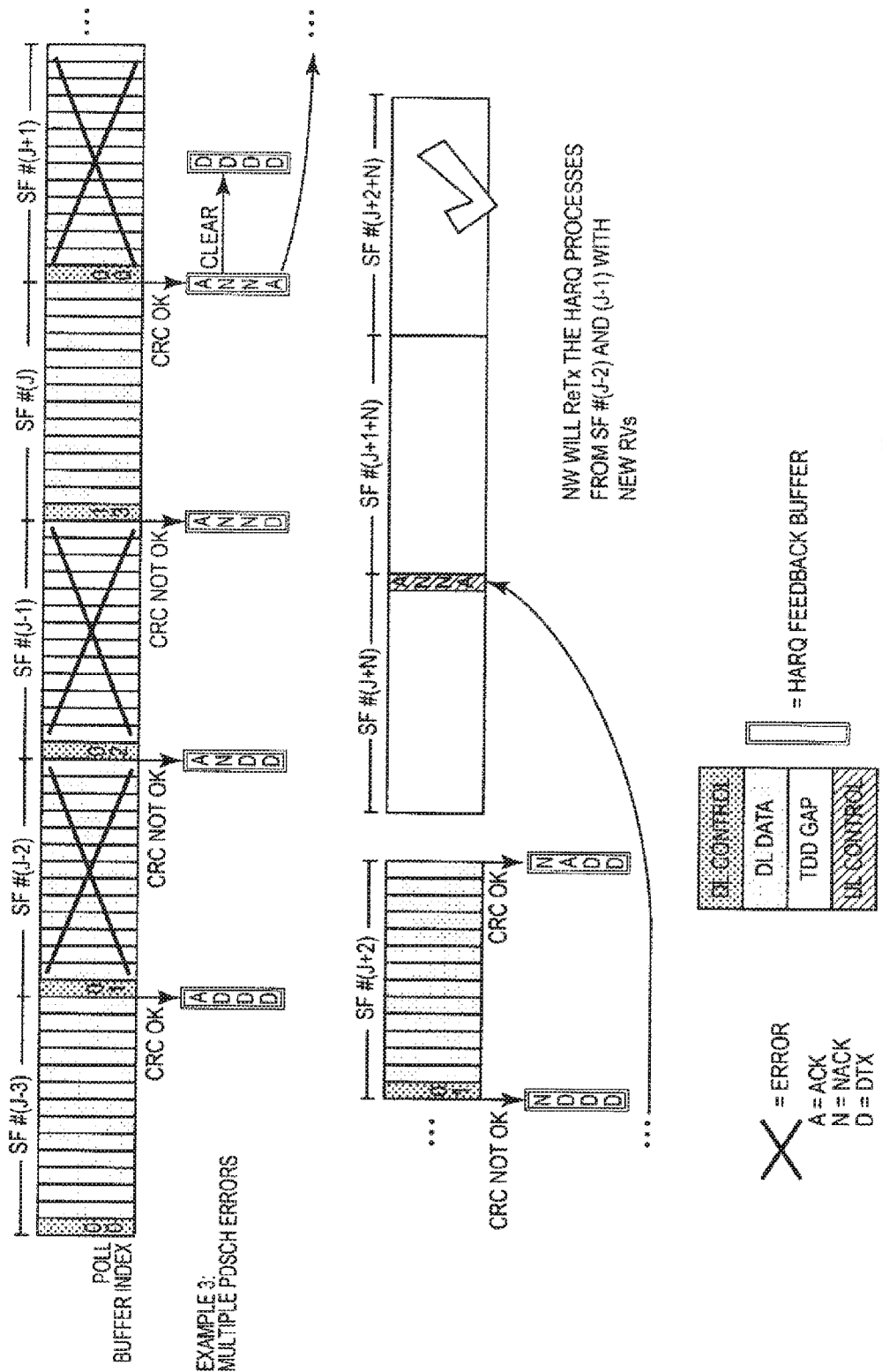
Figure 15A:
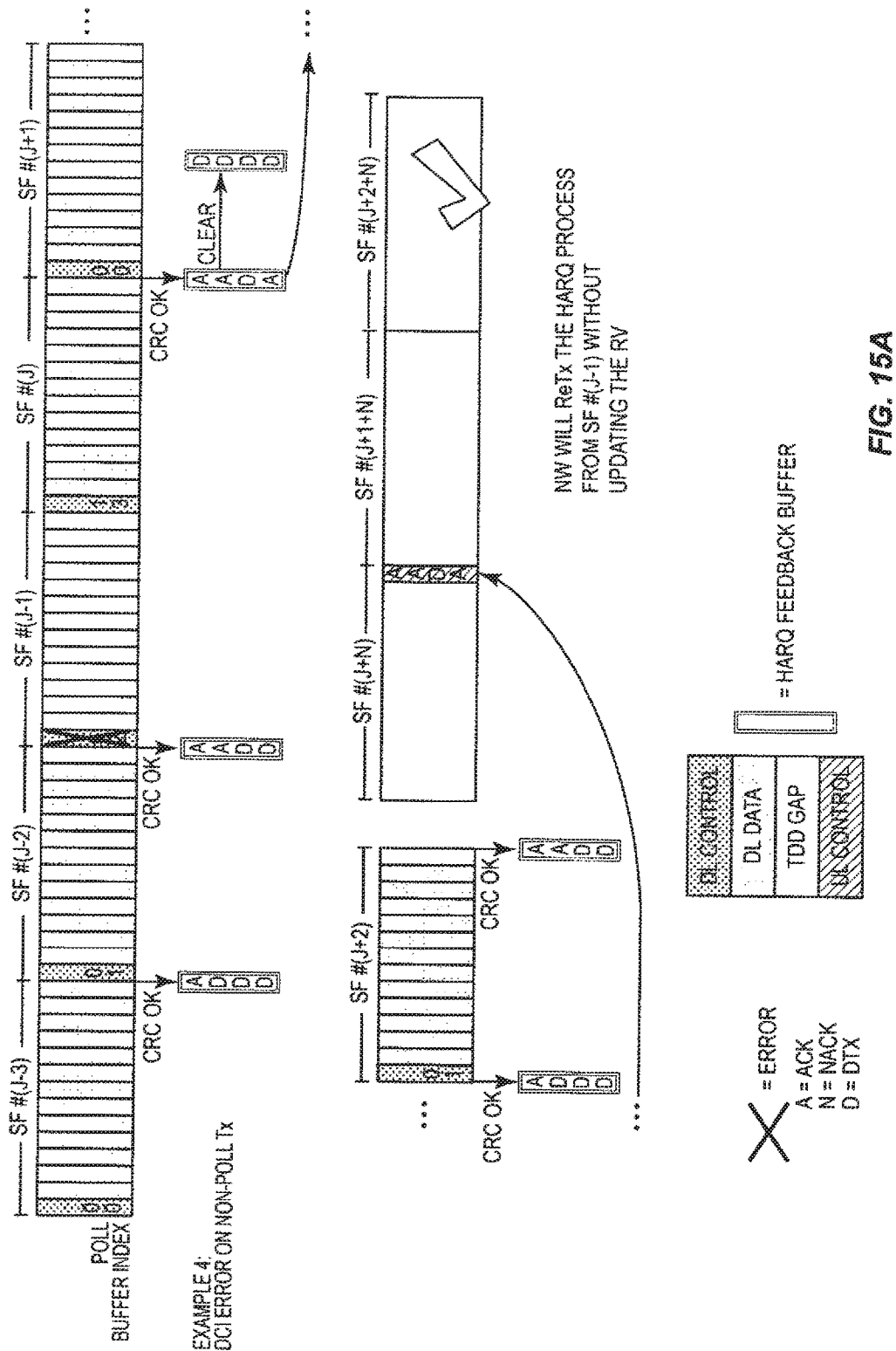
Figure 15B:
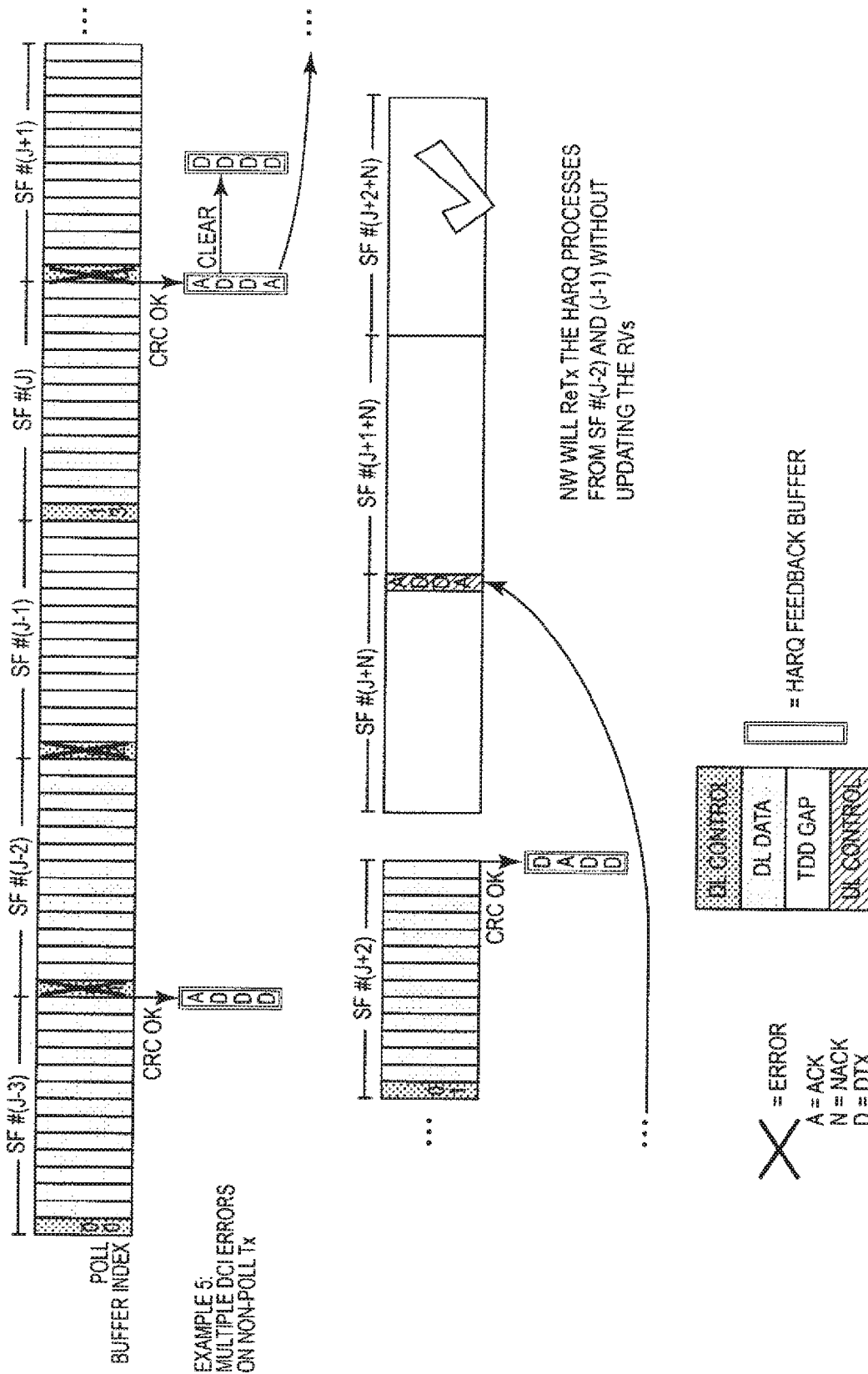
Figure 15C:
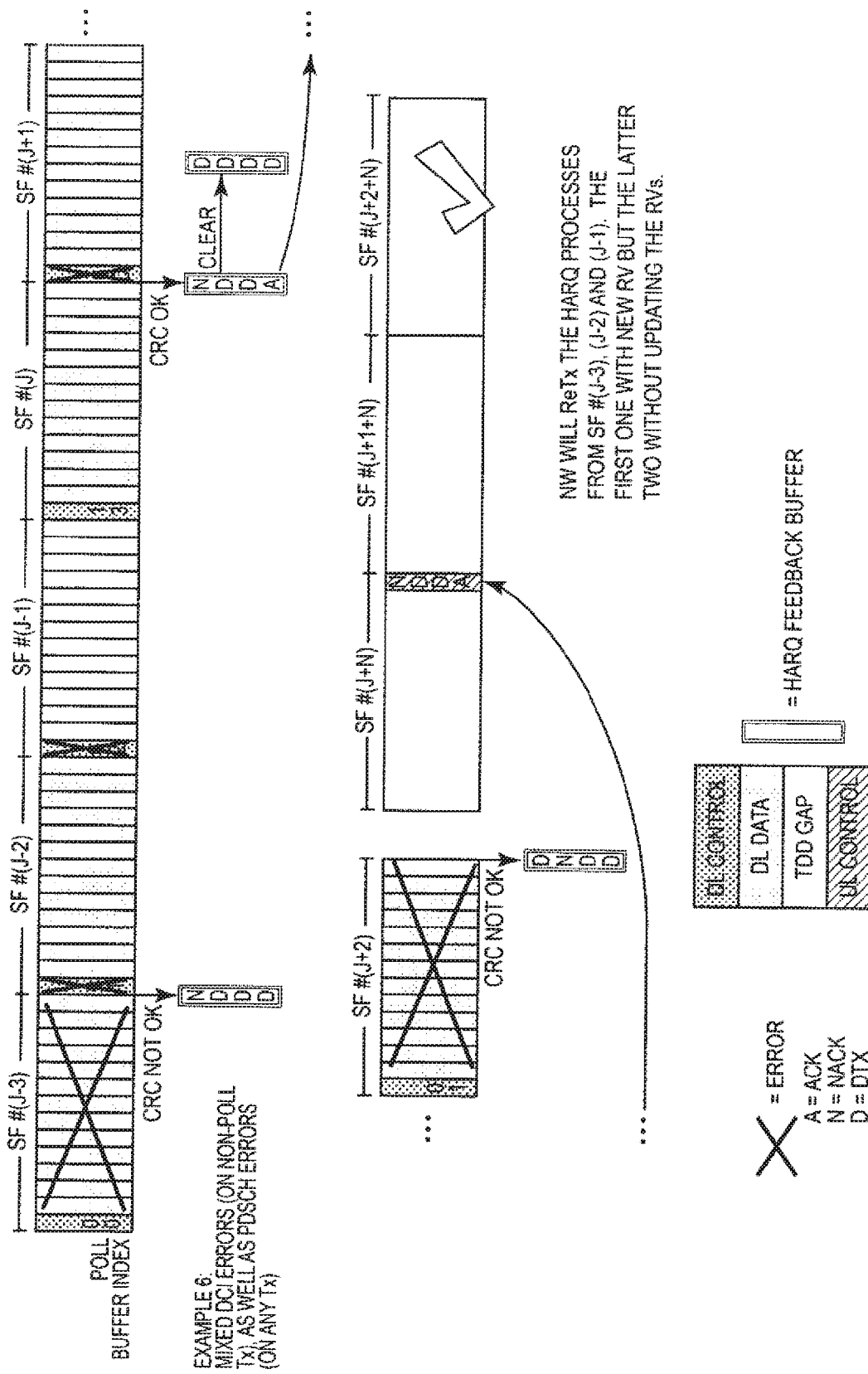
Figure 16A:
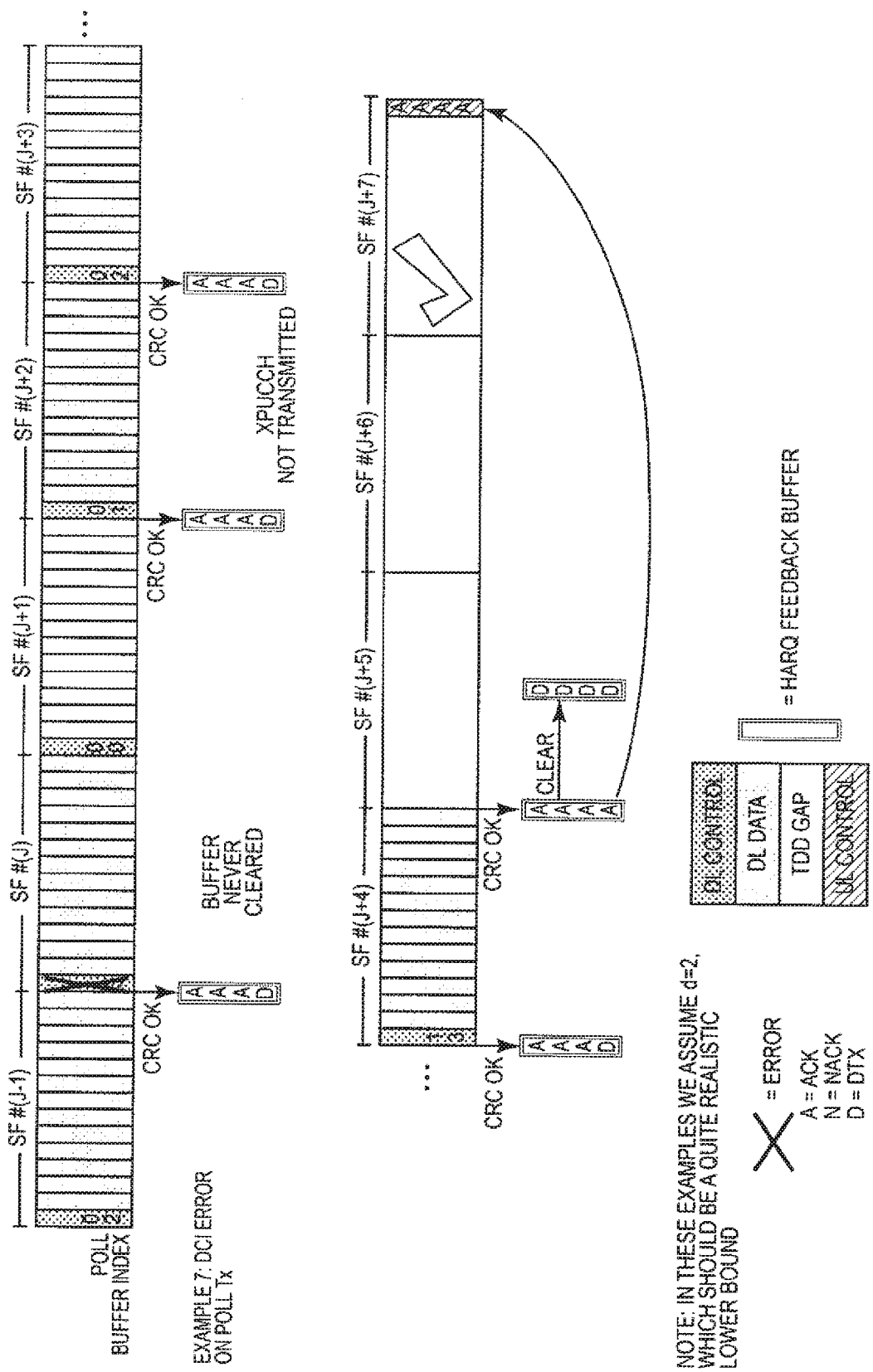
Figure 16B:
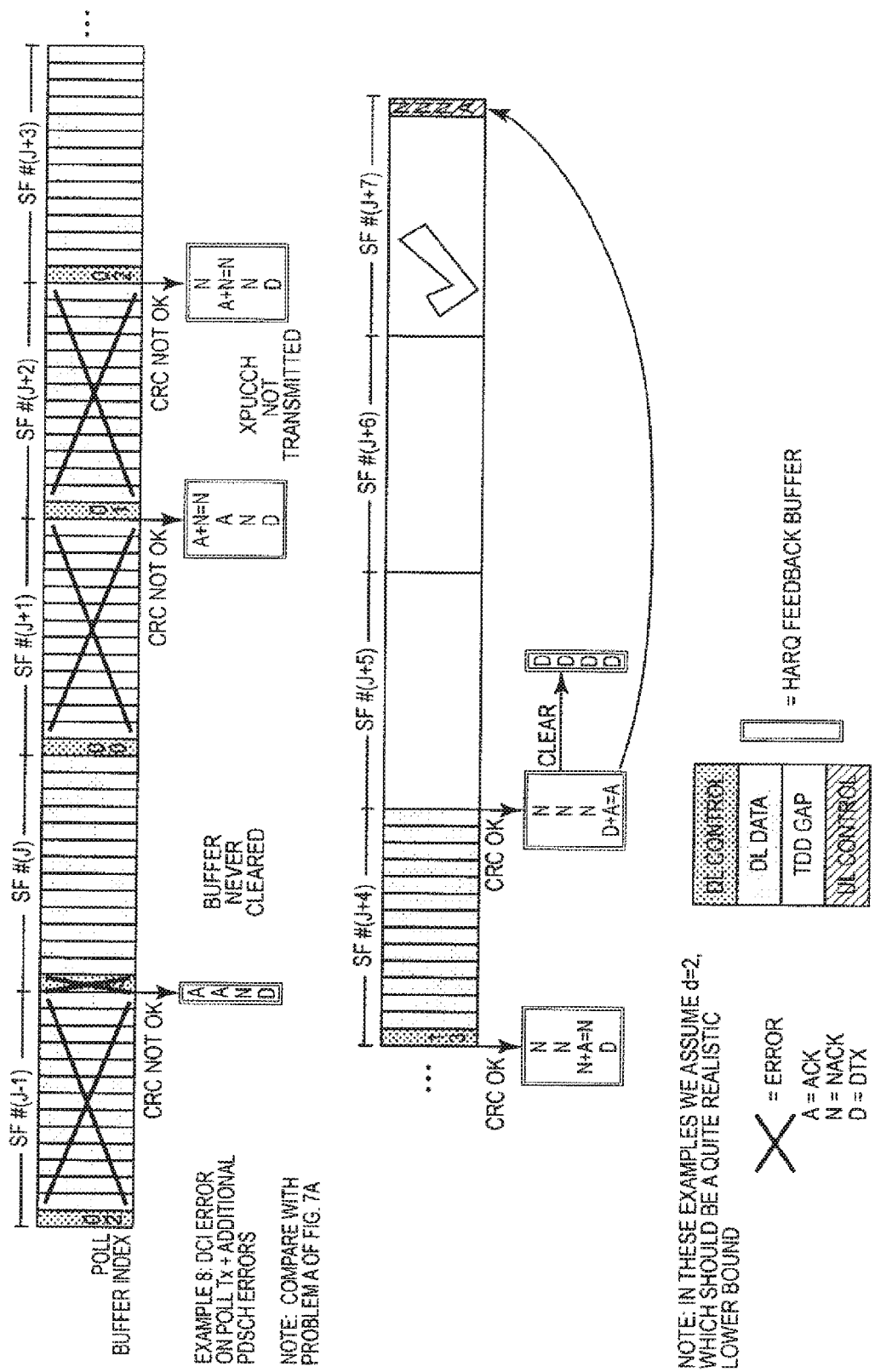
Figure 17A:
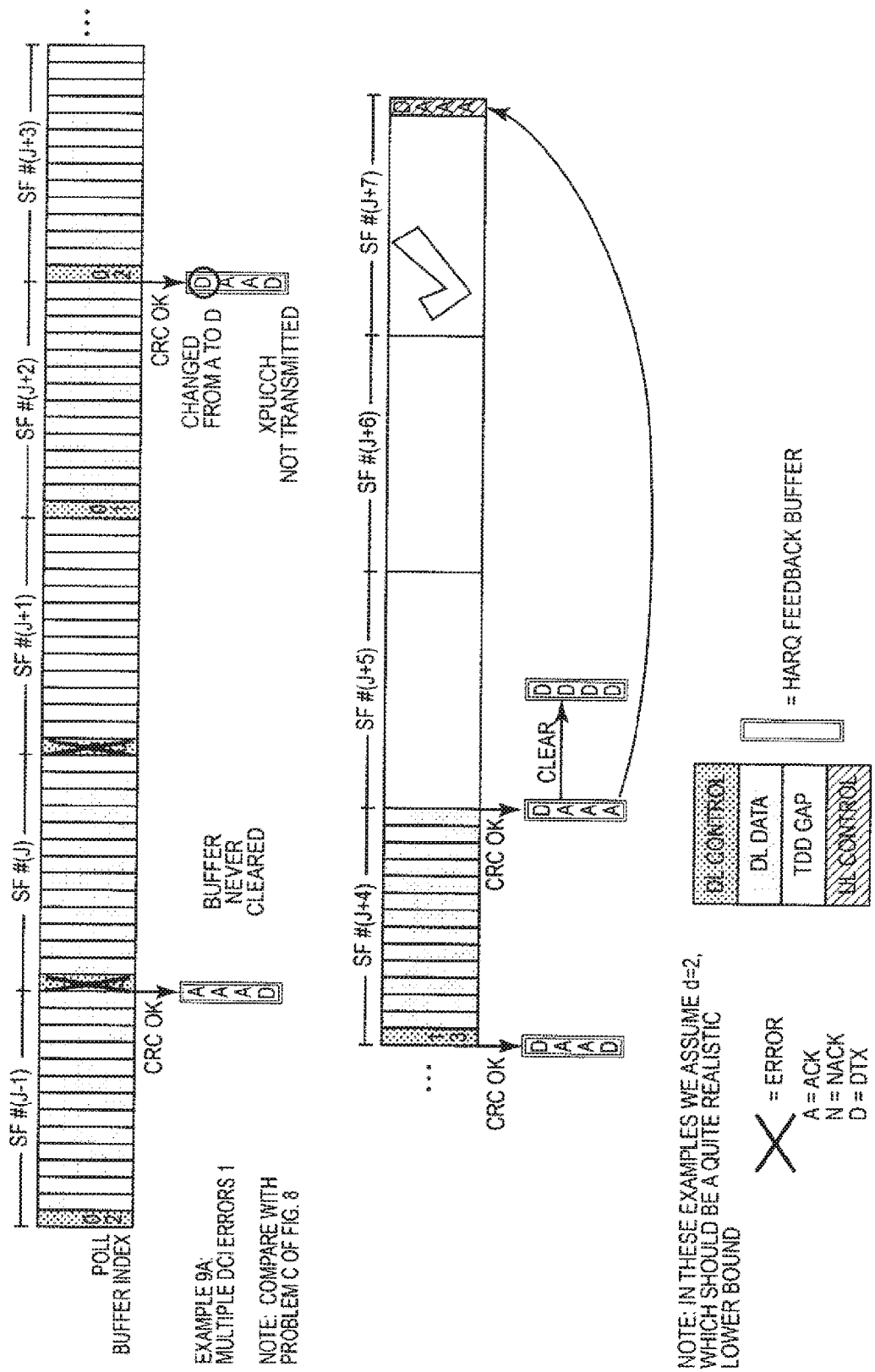
Figure 17B:
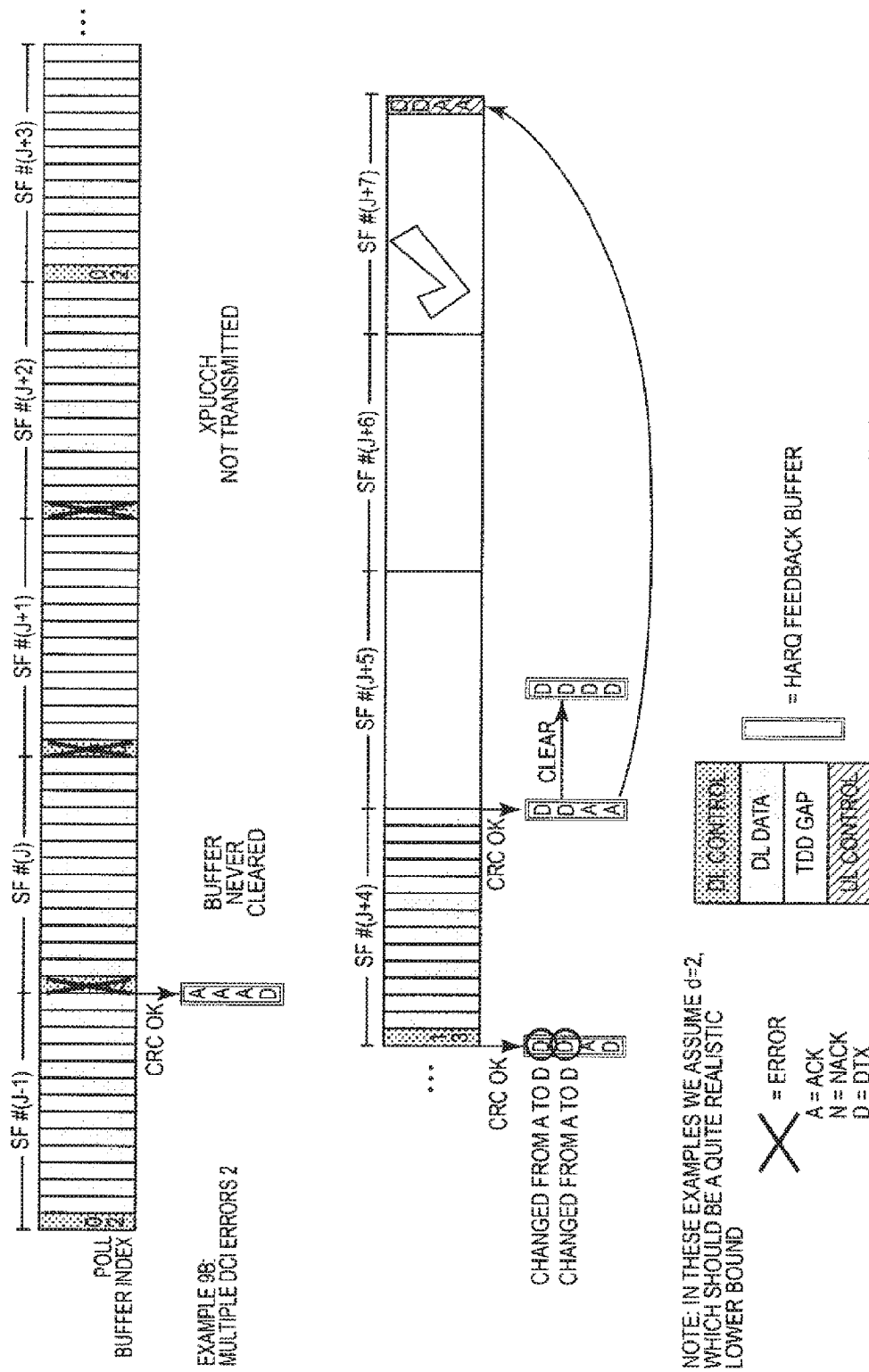
Figure 18A:
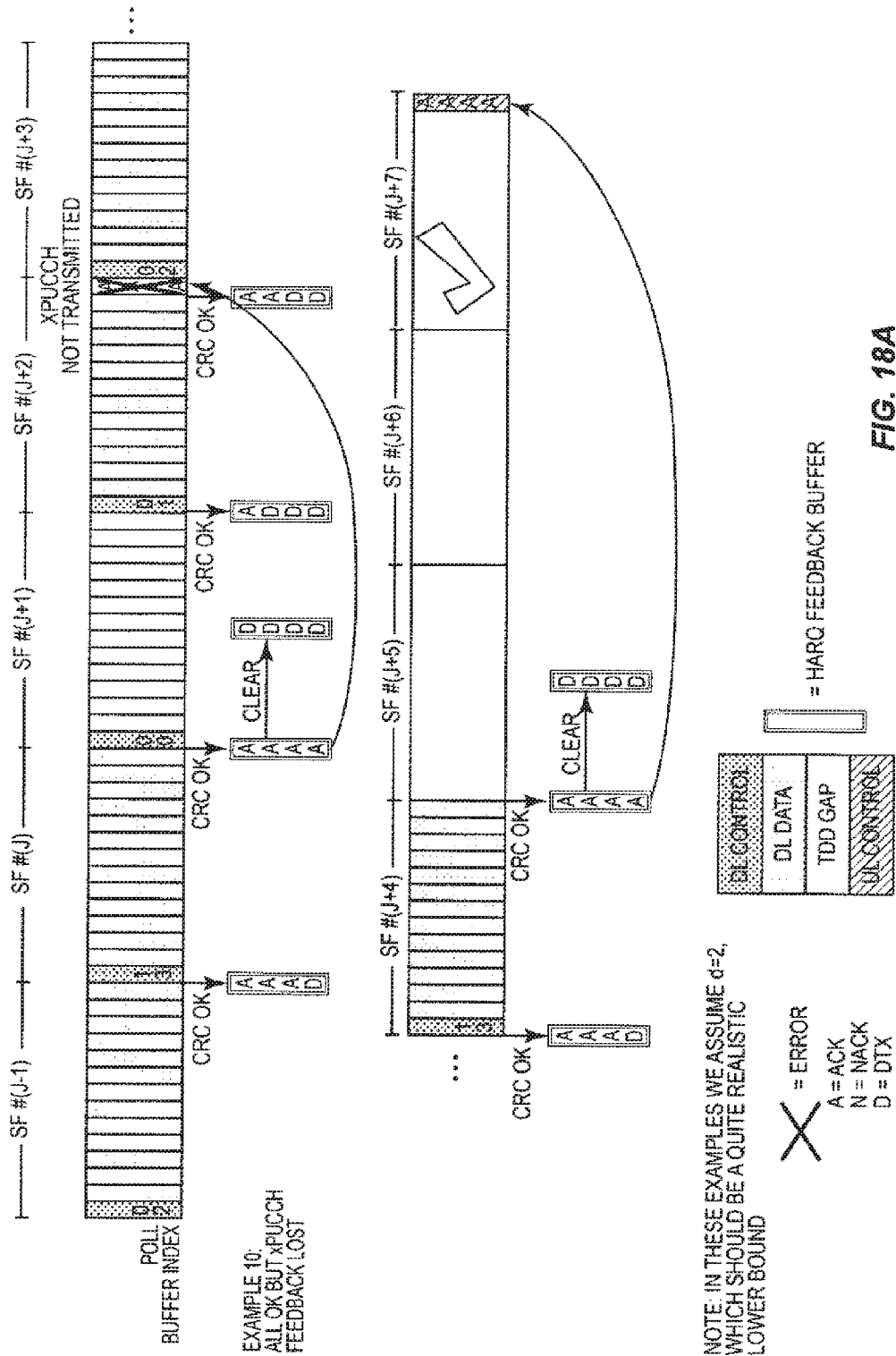
Figure 18B:
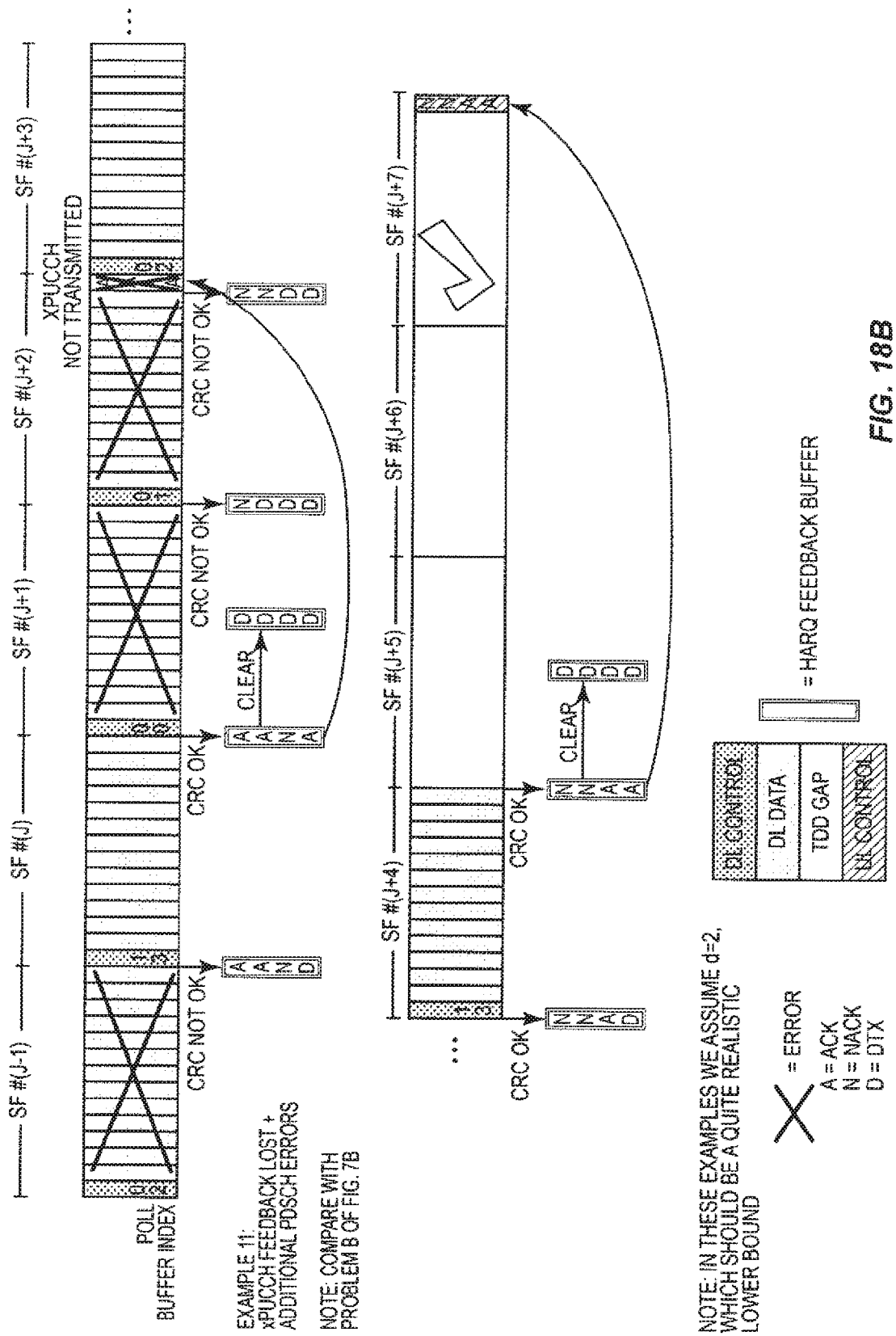

FIG. 13 is a flow chart that illustrates a network side HARQ feedback interpretation procedure according to some embodiments of the present disclosure. This procedure is performed by a network node such as, for example, the radio access node 14. Here, the HARQ feedback for a particular BI is given for the related HARQ process. Depending on the indicated feedback (ACK/NACK/DTX), the Redundancy Version (RV) to be used by the HARQ process will be updated accordingly (NACK) or not (DTX). The particular HARQ process will thereafter—towards the scheduler—be indicated as eligible either for retransmissions (NACK or DTX) or as free (ACK). In the latter case, the HARQ process will be cleared and a New Data Indicator (NDI) will be toggled.

In particular, as illustrated in FIG. 13, the procedure begins when HARQ feedback FB(BI) for a HARQ process HP is to be processed (e.g., in step 622 of FIG. 12) (step 700). If the HARQ feedback (FB) is DTX (step 702; YES), then the network flags/marks the HARQ process HP as requiring retransmission (step 704). Otherwise, if the HARQ feedback (FB) is NACK (step 706; YES), then the network updates the RV for the HARQ process HP (step 708) and flags/marks the HARQ process HP as requiring retransmission (step 704). Otherwise, if the HARQ feedback (FB) is ACK (step 710; YES), then the network clears the HARQ process HP and toggles it's New Data Indicator (NDI), which is an existing indicator in LTE, thereby instructing the HARQ process to flush the HARQ buffer since this transmission is not related to an earlier transmission but is rather a new transmission (step 712) and flags/marks the HARQ process HP as free/ready for new data (step 714). Note that step 710 is not necessary in that if the HARQ feedback is not DTX and not NACK, then, in this example, it must be ACK. So, the process may proceed directly from the "NO" branch of step 706 to step 712.

FIGS. 14A through 14C, 15A through 15C, 16A and 16B, 17A and 17B, and 18A and 18B illustrate a number of examples that illustrate various aspects certain embodiments of the enhanced HARQ feedback solution described above. These examples are referred to as Examples 1 through 11. Example 1 illustrates a scenario in which all DCI messages and downlink data are successfully received by the wireless device 18 and the uplink transmission for the HARQ feedback is successfully received by the network.

Example 2 illustrates a scenario with a PDSCH error that results in a NACK for subframe SF #(J–1). In response to the NACK, the network will retransmit the HARQ process from subframe SF #(J–1) with a new RV.

Example 3 illustrates a scenario with multiple PDSCH errors. In response to the NACKs for subframes SF #(J–2) and SF #(J–1), the network will retransmit the HARQ process from subframes SF #(J–2) and SF #(J–1) with new RVs.

Example 4 illustrates a scenario with a DCI error for a non-polling DCI message. Here, the network will retransmit the HARQ process from subframe SF #(J–1) without updating the RV.

Example 5 illustrates a scenario with multiple DCI errors on non-polling DCI messages. Here, the network will retransmit the HARQ processes from subframes SF #(K–2) and SF #(J–1) without updating the RVs.

Example 6 illustrates a scenario with mixed DCI errors on non-polling DCI messages. Here, the network will retransmit the HARQ processes from subframes SF #(J–3), SF #(J–2), and SF #(J–1), where the first HARQ process is retransmitted with a new RV but the latter two are retransmitted without updating the RVs.

Example 7 illustrates a scenario with a DCI error on a polling DCI message. At subframe SF #(J+2), i.e., the subframe in which the network is expecting transmission of the HARQ feedback, the network will notice the lack of HARQ feedback and realize that there was a DCI error at subframe SF #(J), which is thereafter retransmitted with the same RV. At subframe SF #(J+7), the network will do nothing since the HARQ feedback includes all ACKs.

Example 8 illustrates a scenario with a DCI error on a polling DCI message plus additional PDSCH errors. Note that it is helpful to compare this example to Problem A of FIG. 7A. At subframe SF #(J+2), the network will notice the lack of HARQ feedback and realize that there was a DCI error at subframe SF #(J). This will implicitly DTX the HARQ process transmitted at subframe SF #(J), which is thereafter retransmitted with the same RV. At subframe SF #(J+7), the network will retransmit all HARQ processes being NACK'ed:

For BI=0: Retransmit HARQ processes of subframes SF #(J−3) and SF #(J+1)
For BI=1: Retransmit HARQ processes of subframes SF #(J−2) and SF #(J+2)
For BI=1: Retransmit HARQ processes of subframes SF #(J−1) and SF #(J+3)

It may be noticed that those of subframes SF #(J−3), SF #(J−2), and SF #(J+3) are "unnecessary" since these were all received successfully. Given the low error rate of the DCI (~1%), the impact of these "unnecessary" retransmissions should be minor compared to the amount of PDSCH errors.

Example 9A illustrates a scenario in which there are multiple DCI errors. It may be beneficial to compare this example with Problem C of FIG. 8. At subframe SF #(J+2), the network will notice the lack of HARQ feedback and realize that there was a DCI error at subframe SF #(J). This will implicitly DTX the HARQ process transmitted at subframe SF #(J); hence, the HARQ process for subframe SF #(J) will be retransmitted. The network also detects a "jump" in the BI sequence, i.e., BI=1 is preceded by BI=2 instead of BI=0, and therefore concludes that BI=0 was probably missed. In other words, the network detects a DCI error in a DCI error for the subframe that corresponds to the missed BI=0. Hence, that entry in the HARQ feedback buffer is set to DTX. Further, at subframe SF #(J+7), the network will mark the "new" transmission from subframe SF #(J+1) as well as the "old" transmission from subframe SF #(J−3) as DTX and, as such, both of these will be retransmitted. The other "new" transmissions at subframes SF #(J+2), SF #(J+3), and SF #(J+4) will be ACK'ed, and the old transmissions from subframes SF #(J−2) and SF #(J−1) will be ACK'ed as well.

Example 9B illustrates another scenario with multiple DCI errors. At subframe SF #(J+2), the network will notice the lack of HARQ feedback and realize that there was a DCI error at subframe SF #(J). This will implicitly DTX the HARQ process transmitted at subframe SF #(J); hence, the HARQ process for subframe SF #(J) will be retransmitted. The network also detects a "jump" in the BI sequence (i.e., BI=1 and BI=2 are preceded by BI=2 instead of BI=0) and therefore concludes that BI=0 and BI=1 were probably missed. In other words, the network detects a DCI error in a DCI error for the subframes that correspond to the missed BI=0 and BI=1. Hence, those entries in the HARQ feedback buffer are set to DTX. Further, at subframe SF #(J+7), the network will mark the "new" transmissions from subframes SF #(J+1) and SF #(J+2) as well as the "old" transmissions from subframes SF #(J−3) and SF #(J−2) as DTX and, as such, both of these will be retransmitted. The other "new" transmissions at subframes SF #(J+3) and SF #(J+4) will be ACK'ed, and the old transmission from subframe SF #(J−1) will be ACK'ed as well.

Example 10 illustrates a scenario in which all downlink data was successfully received but there is an xPUCCH error, i.e., the xPUCCH transmission is lost or, in other words, not received by the network. At subframe SF #(J+2), the network will notice that lack of HARQ feedback and realize that there was an xPUCCH error. This will implicitly NACK all HARQ processes expected to be reported, namely, those from subframes SF #(J−3), SF #(J−2), SF #(J−1), and SF #(J). At subframe SF #(J+7), the network will do nothing since all downlink transmissions are ACK'ed.

Example 11 illustrates a scenario in which xPUCCH feedback is lost plus there are additional PDSCH errors. It may be beneficial to compare this example to Problem B of FIG. 7B. At subframe SF #(J+2), the network will notice the lack of HARQ feedback and realize that there was an xPUCCH error. This will implicitly NACK all HARQ processes expected to be reported, namely, those from subframes SF #(J−3), SF #(J−2), SF #(J−1), and SF #(J). It may be noticed that those of subframes SF #(J−3) and SF #(J−2) are "unnecessary" since these downlink transmissions were successfully received. Hence, it is important to keep the xPUCCH errors rather low. Further, at subframe SF #(J+7), the network will retransmit all HARQ processes being NACK'ed:

For BI=0: Retransmit HARQ processes of subframe SF #(J+1) (subframe SF #(J−3) is already NACK'ed).
For BI=1: Retransmit HARQ processes of subframe SF #(J+2) (subframe SF #(J−2) is already NACK'ed).

Example Wireless Device and Radio Access Node Implementations

Figure 19:
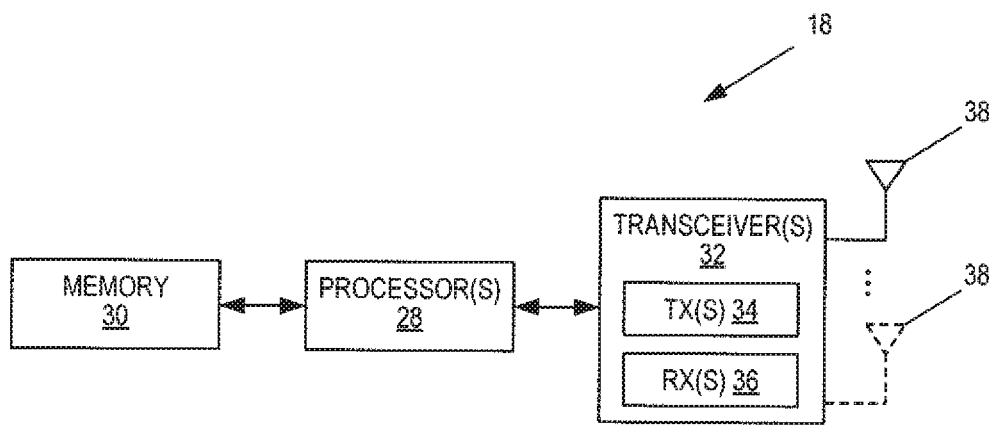
FIGS. 19 and 20 are block diagrams of example embodiments of a wireless device according to some embodiments of the present disclosure.

FIG. 19 is a schematic block diagram of the wireless device 18 (e.g., a UE) according to some embodiments of the present disclosure. As illustrated, the wireless device 18 includes one or more processors 28, e.g., Central Processing Units (CPUs), Application Specific Integrated Circuits (ASICs), Field Programmable Gate Arrays (FPGAs), and/or the like, memory 30, and one or more transceivers 32 each including one or more transmitters 34 and one or more receivers 36 coupled to one or more antennas 38. In some embodiments, the functionality of the wireless device 18 described above may be fully or partially implemented in software that is, e.g., stored in the memory 30 and executed by the processor(s) 28.

In some embodiments, a computer program including instructions which, when executed by at least one processor, causes the at least one processor to carry out the functionality of the wireless device 18 according to any of the embodiments described herein is provided. In some embodiments, a carrier containing the aforementioned computer program product is provided. The carrier is one of an electronic signal, an optical signal, a radio signal, or a computer readable storage medium, e.g., a non-transitory computer readable medium such as memory.

Figure 20:
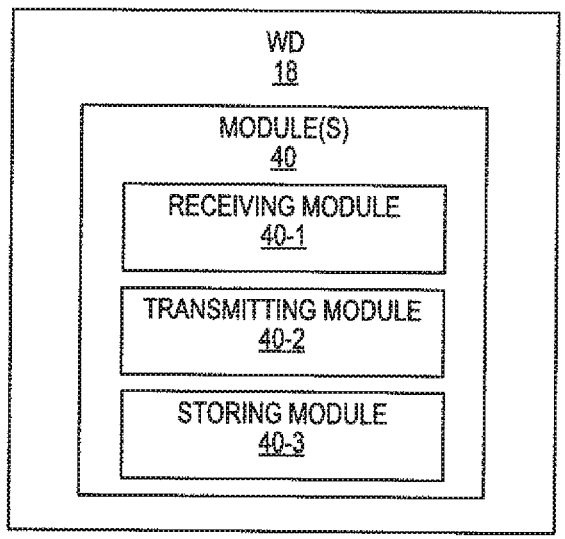

FIG. 20 is a schematic block diagram of the wireless device 18 according to some other embodiments of the present disclosure. The wireless device 18 includes one or more modules 40, each of which is implemented in software. The module(s) 40 provide the functionality of the wireless device 18 described herein. For example, the module(s) 40 may include a receiving module 40-1 operable to receive DCI messages from the network, where the DCI messages may include, depending on the embodiment, an indication of a HARQ timing offset K, a HARQ feedback buffer index, and/or a polling indicator, as described above with respect to the various embodiments of the present disclosure. As another example, the module(s) 40 may include a transmitting module 40-2 operable to transmit HARQ feedback according to any of the embodiments described herein. As yet another example, the module(s) 40 may include a storing module 40-3 operable to store HARQ feedback in a HARQ feedback buffer, as described above with respect to some embodiments of the present disclosure.

Figure 21:
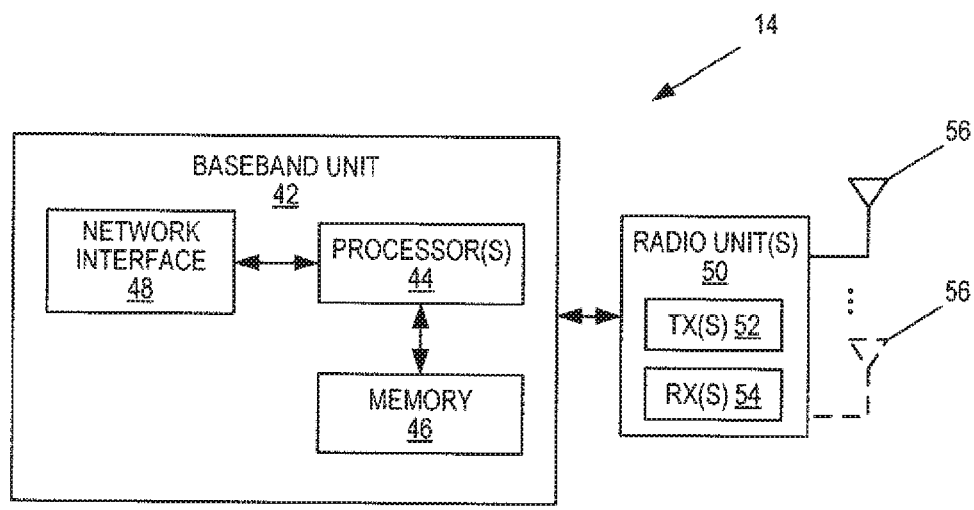

FIG. 21 is a schematic block diagram of the base station 14 (or more generally radio access node 14) according to some embodiments of the present disclosure. This discussion is equally applicable to other types of radio access nodes. Further, other types of network nodes may have similar architectures (particularly with respect to including processor(s), memory, and a network interface). As illustrated, the base station 14 includes a baseband unit 42 that includes one or more processors 44, e.g., CPUs, ASICs, FPGAs, and/or the like, memory 46, and a network interface 48 as well as one or more radio units 50 that each includes one transmitters 52 and one or more receivers 54 coupled to one or more antennas 56. In some embodiments, the functionality of the base station 14, or more generally the functionality of a radio access node or more generally the functionality of a network node, described above may be fully or partially implemented in software that is, e.g., stored in the memory 46 and executed by the processor(s) 44.

Figure 22:
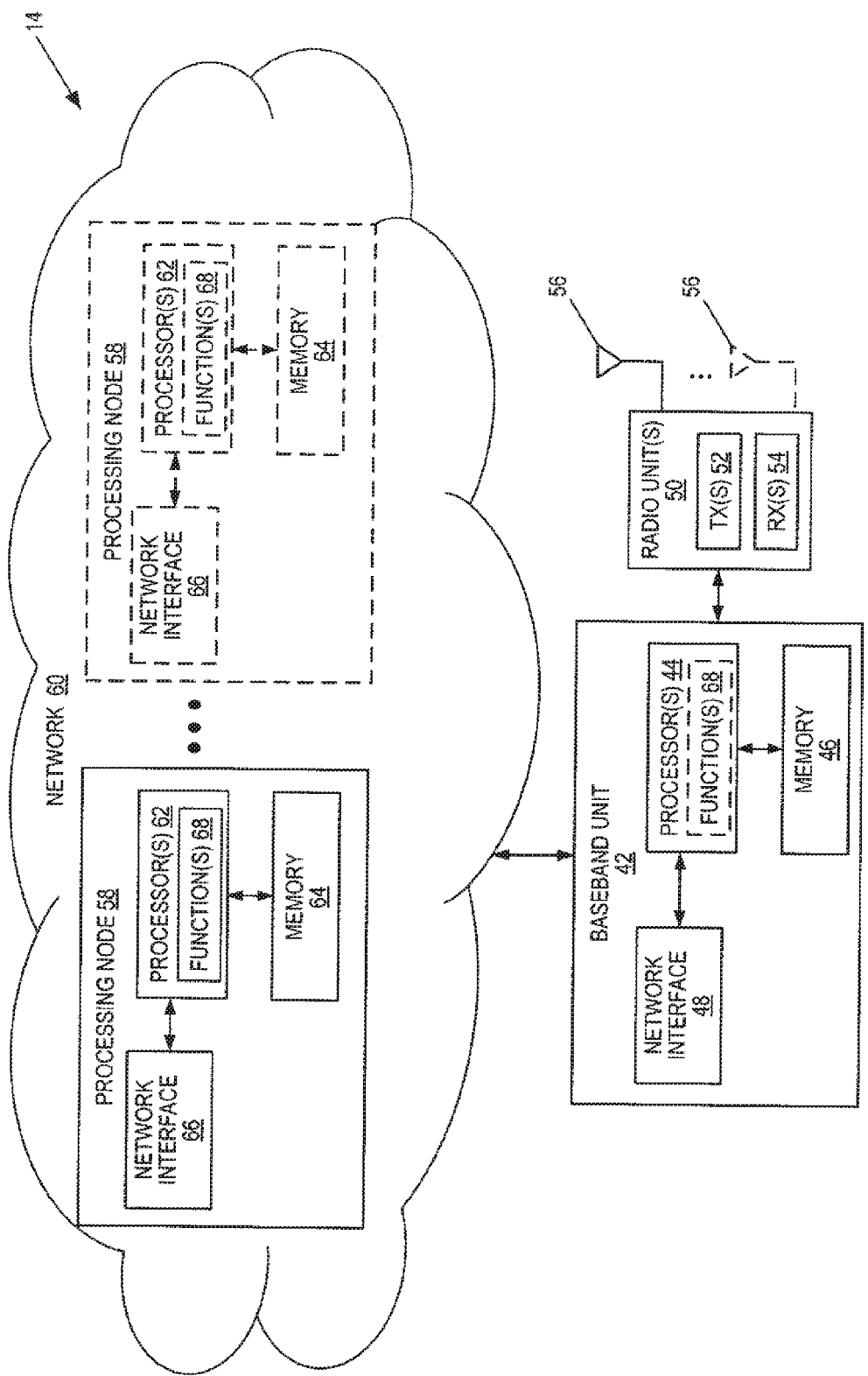
FIGS. 21 through 23 are block diagrams of example embodiments of a base station according to some embodiments of the present disclosure.

FIG. 22 is a schematic block diagram that illustrates a virtualized embodiment of the base station 14 according to some embodiments of the present disclosure. This discussion is equally applicable to other types of radio access nodes. Further, other types of network nodes may have similar virtualized architectures.

As used herein, a "virtualized" network node, e.g., a virtualized base station or a virtualized radio access node, is an implementation of the network node in which at least a portion of the functionality of the network is implemented as a virtual component, e.g., via a virtual machine(s) executing on a physical processing node(s) in a network(s). As illustrated, in this example, the base station 14 includes the baseband unit 42 that includes the one or more processors 48, e.g., CPUs, ASICs, FPGAs, and/or the like, the memory 46, and the network interface 48 as well as the one or more radio units 50 that each includes the one or more transmitters 52 and the one or more receivers 54 coupled to the one or more antennas 56, as described above. The baseband unit 42 is connected to the radio unit(s) 50 via, for example, an optical cable or the like. The baseband unit 42 is connected to one or more processing nodes 58 coupled to or included as part of a network(s) 60 via the network interface 48. Each processing node 58 includes one or more processors 62, e.g., CPUs, ASICs, FPGAs, and/or the like, memory 64, and a network interface 66.

In this example, functions 68 of the base station 14 described herein are implemented at the one or more processing nodes 58 or distributed across the baseband unit 42 and the one or more processing nodes 58 in any desired manner. In some particular embodiments, some or all of the functions 68 of the base station 14 described herein are implemented as virtual components executed by one or more virtual machines implemented in a virtual environment(s) hosted by the processing node(s) 58. As will be appreciated by one of ordinary skill in the art, additional signaling or communication between the processing node(s) 58 and the baseband unit 42 is used in order to carry out at least some of the desired functions 68. Notably, in some embodiments, the baseband unit 42 may not be included, in which case the radio unit(s) 50 communicate directly with the processing node(s) 58 via an appropriate network interface(s).

Thus, with respect to the direct scheduling embodiment, in some embodiments, the processing node(s) 58 may operate to indicate or otherwise cause transmission of the DCI including the indication of the HARQ feedback timing offset K to the wireless device 18 via the radio unit(s) 50. As another example, some or all of the network side polling procedure of FIG. 10 may be performed by the processing node(s) 58 and/or some or all of the network side xPUCCH detection procedure of FIG. 12 may be performed by the processing node(s) 58 based on the downlink HARQ feedback received from the wireless device 18 via the radio unit(s) 50.

In some embodiments, a computer program including instructions which, when executed by at least one processor, causes the at least one processor to carry out the functionality of the network, e.g., in the form of a network node or a radio access node, according to any of the embodiments described herein is provided. In some embodiments, a carrier containing the aforementioned computer program product is provided. The carrier is one of an electronic signal, an optical signal, a radio signal, or a computer readable storage medium, e.g., a non-transitory computer readable medium such as memory.

Figure 23:
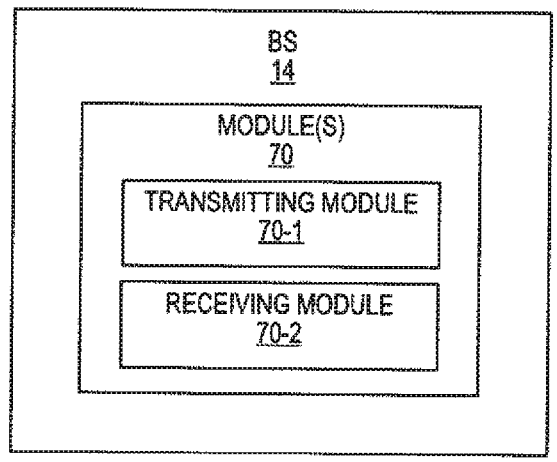

FIG. 23 is a schematic block diagram of the base station 14 (or more generally radio access node 14) according to some other embodiments of the present disclosure. The base station 14 includes one or more modules 70, each of which is implemented in software. The module(s) 70 provide the functionality of the base station 14 described herein. The module(s) 70 may include, for example, a transmitting module 70-1 operable to transmit DCI messages and downlink data according to any of the embodiments described herein and a receiving module 70-2 operable to receive and process HARQ feedback according to any of the embodiments described herein. Note that other types of radio access nodes may be similar architectures as shown in FIG. 23 for the base station 14.

Example Embodiments

While not being limited to any particular embodiment, some example embodiments of the present disclosure are described below.

Embodiment 1: A method of operation of a wireless device (18) in a cellular communications system (10), comprising:
receiving (102) downlink control information in a first subframe, T, wherein the downlink control information comprises an indication of a Hybrid Automatic Repeat Request, HARQ, timing offset, K; and
transmitting (106) HARQ feedback in a subframe T+K.

Embodiment 2: The method of embodiment 1 wherein transmitting (106) the HARQ feedback comprises:
combining a plurality of downlink HARQ feedback flags into a single downlink HARQ transmission; and
transmitting the single downlink HARQ transmission in the subframe T+K.

Embodiment 3: The method of embodiment 2 wherein combining the plurality of HARQ feedback flags comprises jointly encoding the plurality of HARQ feedback flags into a codeword for the single downlink HARQ transmission.

Embodiment 4: The method of embodiment 2 or embodiment 3 wherein the downlink control information further comprises information that indicates which feedback flags are to be combined into the single downlink HARQ transmission.

Embodiment 5: The method of any of embodiments 1-4 wherein the indication of the HARQ timing offset K is a value for the HARQ timing offset K.

Embodiment 6: The method of any of embodiments 1-4 wherein the indication of the HARQ timing offset K is a value S, wherein the HARQ timing offset K=N+S, where N is a predefined or preconfigured value.

Embodiment 7: The method of any of embodiments 1-6 further comprising detecting a downlink control information failure.

Embodiment 8: A wireless device (18) adapted to operate according to any of Embodiments 1-7.

Embodiment 9: A wireless device (18) enabled to operate in a cellular communications system (10), the wireless device (18) comprising:
a transceiver (32);
at least one processor (28); and
memory (30) storing instructions that are executable by the at least one processor (28) whereby the wireless device (18) is operable to:
receive, via the transceiver (32), downlink control information in a first subframe, T, wherein the downlink control information comprises an indication of a Hybrid Automatic Repeat Request, HARQ, timing offset, K; and
transmit, via the transceiver, HARQ feedback in a subframe T+K.

Embodiment 10: The wireless device (18) of embodiment 9, in order to transmit the HARQ feedback, the wireless device (18) is further operable to:
combine a plurality of downlink HARQ feedback flags into a single downlink HARQ transmission; and
transmit the single downlink HARQ transmission in the subframe T+K.

Embodiment 11: The wireless device (18) of embodiment 10 wherein, in order to combine the plurality of HARQ feedback flags, the wireless device (18) is further operable to jointly encode the plurality of HARQ feedback flags into a codeword for the single downlink HARQ transmission.

Embodiment 12: The wireless device (18) of embodiment 10 or embodiment 11 wherein the downlink control information further comprises information that indicates which feedback flags are to be combined into the single downlink HARQ transmission.

Embodiment 13: The wireless device (18) of any of embodiments 9-12 wherein the indication of the HARQ timing offset K is a value for the HARQ timing offset K.

Embodiment 14: The wireless device (18) of any of embodiments 9-12 wherein the indication of the HARQ timing offset K is a value S, wherein the HARQ timing offset K=N+S, where N is a predefined or preconfigured value.

Embodiment 15: A wireless device (18) enabled to operate in a cellular communications system (10), the wireless device (18) comprising:
means for receiving downlink control information in a first subframe, T, wherein the downlink control information comprises an indication of a Hybrid Automatic Repeat Request, HARQ, timing offset, K; and
means for transmitting HARQ feedback in a subframe T+K.

Embodiment 16: A wireless device (18) enabled to operate in a cellular communications system (10), the wireless device (18) comprising:
a receiving module (40-1) operable to receive downlink control information in a first subframe, T, wherein the downlink control information comprises an indication of a Hybrid Automatic Repeat Request, HARQ, timing offset, K; and
a transmitting module (40-2) operable to transmit HARQ feedback in a subframe T+K.

Embodiment 17: A method of operation of a wireless device (18) in a cellular communications system (10), comprising:
receiving (302) a downlink control information message comprising a Hybrid Automatic Repeat Request, HARQ, feedback buffer index; and
storing (304) a downlink HARQ feedback flag in position within the HARQ feedback buffer that corresponds to the HARQ feedback buffer index.

Embodiment 18: The method of embodiment 17 further comprising repeating the steps of receiving (302) and storing (304) for one or more additional downlink control information messages.

Embodiment 19: The method of embodiment 18 further comprising:
receiving (306, YES) a polling request from a network node; and
upon receiving the polling request:
creating (308) an uplink control message comprising the downlink HARQ feedback flags stored in the downlink HARQ feedback buffer; and
transmitting (314) the uplink control message.

Embodiment 20: The method of embodiment 19 wherein creating the uplink control message comprises jointly encoding the downlink HARQ feedback flags into a codeword for the uplink control message.

Embodiment 21: The method of embodiment 19 or 20 wherein transmitting the uplink control message comprises transmitting the uplink control message a subframe T+N, where subframe T is the subframe in which the polling request was received and N is a HARQ feedback offset.

Embodiment 22: The method of embodiment 21 wherein the HARQ feedback offset N is predefined or preconfigured.

Embodiment 23: The method of embodiment 21 wherein the HARQ feedback offset N is a function of an index received either in the polling request or a downlink control information message received in subframe T.

Embodiment 24: The method of any of embodiments 17-23 further comprising detecting a downlink control information failure.

Embodiment 25: A wireless device (18) adapted to operate according to any of embodiments 17-24.

Embodiment 26: A wireless device (18) enabled to operate in a cellular communications system (10), the wireless device (18) comprising:
a transceiver (32);
at least one processor (28); and
memory (30) storing instructions that are executable by the at least one processor (28) whereby the wireless device (18) is operable to:

receive, via the transceiver (32), a downlink control information message comprising a Hybrid Automatic Repeat Request, HARQ, feedback buffer index; and store a downlink HARQ feedback flag in position within the HARQ feedback buffer that corresponds to the HARQ feedback buffer index.

Embodiment 27: The wireless device (18) of embodiment 26 wherein the wireless device (18) is further operable to repeat the steps of receiving and storing for one or more additional downlink control information messages.

Embodiment 28: The wireless device (18) of embodiment 27 wherein the wireless device (18) is further operable to:

receive, via the transceiver (32), a polling request from a network node; and upon receiving the polling request:
create an uplink control message comprising the downlink HARQ feedback flags stored in the downlink HARQ feedback buffer; and
transmit the uplink control message.

Embodiment 29: The wireless device (18) of embodiment 28 wherein, in order to create the uplink control message, the wireless device (18) is further operable to jointly encode the downlink HARQ feedback flags into a codeword for the uplink control message.

Embodiment 30: The wireless device (18) of embodiment 28 or 29 wherein the wireless device (18) is further operable to transmit the uplink control message in subframe T+N, where subframe T is the subframe in which the polling request was received and N is a HARQ feedback offset.

Embodiment 31: The wireless device (18) of embodiment 30 wherein the HARQ feedback offset N is predefined or preconfigured.

Embodiment 31: The wireless device (18) of embodiment 30 wherein the HARQ feedback offset N is a function of an index received either in the polling request or a downlink control information message received in subframe T.

Embodiment 32: The wireless device (18) of any of embodiments 26-31 wherein the wireless device (18) is further operable to detect a downlink control information failure.

Embodiment 33: A wireless device (18) enabled to operate in a cellular communications system (10), the wireless device (18) comprising:

means for receiving a downlink control information message comprising a Hybrid Automatic Repeat Request, HARQ, feedback buffer index; and means for storing a downlink HARQ feedback flag in position within the HARQ feedback buffer that corresponds to the HARQ feedback buffer index.

Embodiment 34: A wireless device (18) enabled to operate in a cellular communications system (10), the wireless device (18) comprising:

a receiving module (40-1) operable to receive a downlink control information message comprising a Hybrid Automatic Repeat Request, HARQ, feedback buffer index; and a storing module (40-3) operable to store a downlink HARQ feedback flag in position within the HARQ feedback buffer that corresponds to the HARQ feedback buffer index.

Embodiment 35a: A method of operation of a wireless device (18) in a cellular communications system (10), comprising:

receiving a message comprising a Hybrid Automatic Repeat Request, HARQ, feedback buffer index;

determining that reception of data for a current subframe was successful, where the current subframe is the subframe in which the message was received;

determining that a Negative Acknowledgement, NACK, flag is stored in a HARQ feedback buffer of the wireless device (18) at a buffer position that corresponds to the HARQ feedback buffer index comprised in the message; and upon determining that a NACK flag is stored in the HARQ feedback buffer of the wireless device (18) at the buffer position that corresponds to the HARQ feedback buffer index comprised in the message, maintaining a NACK flag in the feedback buffer of the wireless device (18) at the buffer position that corresponds to the HARQ feedback buffer index comprised in the message even though the reception of data for the current subframe was successful.

Embodiment 35: A method of operation of a wireless device (18) in a cellular communications system (10), comprising:

receiving a Downlink Control Information, DCI, message comprising a Hybrid Automatic Repeat Request, HARQ, feedback buffer index;

determining that reception of data for a current subframe was successful, where the current subframe is the subframe in which the DCI message was received;

determining that a Negative Acknowledgement, NACK, flag is stored in a HARQ feedback buffer of the wireless device (18) at a buffer position that corresponds to the HARQ feedback buffer index comprised in the DCI message; and upon determining that a NACK flag is stored in the HARQ feedback buffer of the wireless device (18) at the buffer position that corresponds to the HARQ feedback buffer index comprised in the DCI message, maintaining a NACK flag in the feedback buffer of the wireless device (18) at the buffer position that corresponds to the HARQ feedback buffer index comprised in the DCI message even though the reception of data for the current subframe was successful.

Embodiment 36: The method of embodiment 35 further comprising sending HARQ feedback stored in the HARQ feedback buffer to a network node.

Embodiment 37: The method of embodiment 35 further comprising, for the current subframe, determining whether multiple DCI errors have occurred in multiple consecutive subframes prior to the current subframe.

Embodiment 38: The method of embodiment 37 further comprising, upon determining that multiple DCI errors have occurred in multiple consecutive subframes, storing a Discontinuous Transmission, DTX, flag in the HARQ feedback buffer at a position that corresponds to a HARQ feedback buffer index that immediately precedes the HARQ feedback buffer index comprised in the DCI message.

Embodiment 39: A computer program product comprising instructions which, when executed on at least one processor, cause the at least one processor to carry out the method according to any of embodiments 35-39.

Embodiment 40: A carrier containing the computer program of embodiment 39, wherein the carrier is one of an electronic signal, an optical signal, a radio signal, or a computer readable storage medium.

Embodiment 41: A wireless device (18) enabled to operate in a cellular communications system (10), the wireless device (18) comprising:
  a transceiver (32);
  at least one processor (28); and
  memory (30) storing instructions that are executable by the at least one processor (28) whereby the wireless device (18) is operable to:
    receive, via the transceiver (32), a Downlink Control Information, DCI, message comprising a Hybrid Automatic Repeat Request, HARQ, feedback buffer index;
    determine that reception of data for a current subframe was successful, where the current subframe is the subframe in which the DCI message was received;
    determine that a Negative Acknowledgement, NACK, flag is stored in a HARQ feedback buffer of the wireless device (18) at a buffer position that corresponds to the HARQ feedback buffer index comprised in the DCI message; and
    upon determining that a NACK flag is stored in the HARQ feedback buffer of the wireless device (18) at the buffer position that corresponds to the HARQ feedback buffer index comprised in the DCI message, maintain a NACK flag in the feedback buffer of the wireless device (18) at the buffer position that corresponds to the HARQ feedback buffer index comprised in the DCI message even though the reception of data for the current subframe was successful.

Embodiment 42: The wireless device (18) of embodiment 41 wherein the wireless device (18) is further operable to send HARQ feedback stored in the HARQ feedback buffer to a network node.

Embodiment 43: The wireless device (18) of embodiment 41 wherein the wireless device (18) is further operable to, for the current subframe, determine whether multiple DCI errors have occurred in multiple consecutive subframes prior to the current subframe.

Embodiment 44: The wireless device (18) of embodiment 41 wherein the wireless device (18) is further operable to, upon determining that multiple DCI errors have occurred in multiple consecutive subframes, store a Discontinuous Transmission, DTX, flag in the HARQ feedback buffer at a position that corresponds to a HARQ feedback buffer index that immediately precedes the HARQ feedback buffer index comprised in the DCI message.

Embodiment 45: A wireless device (18) enabled to operate in a cellular communications system (10), the wireless device (18) comprising:
  means for receiving a Downlink Control Information, DCI, message comprising a Hybrid Automatic Repeat Request, HARQ, feedback buffer index;
  means for determining that reception of data for a current subframe was successful, where the current subframe is the subframe in which the DCI message was received;
  means for determining that a Negative Acknowledgement, NACK, flag is stored in a HARQ feedback buffer of the wireless device (18) at a buffer position that corresponds to the HARQ feedback buffer index comprised in the DCI message; and
  means for, upon determining that a NACK flag is stored in the HARQ feedback buffer of the wireless device (18) at the buffer position that corresponds to the HARQ feedback buffer index comprised in the DCI message, maintaining a NACK flag in the feedback buffer of the wireless device (18) at the buffer position that corresponds to the HARQ feedback buffer index comprised in the DCI message even though the reception of data for the current subframe was successful.

Embodiment 46: A wireless device (18) enabled to operate in a cellular communications system (10), the wireless device (18) comprising:
  a receiving module (40-1) operable to receive a Downlink Control Information, DCI, message comprising a Hybrid Automatic Repeat Request, HARQ, feedback buffer index;
  a first determining module (40) operable to determine that reception of data for a current subframe was successful, where the current subframe is the subframe in which the DCI message was received;
  a second determining module (40) operable to determine that a Negative Acknowledgement, NACK, flag is stored in a HARQ feedback buffer of the wireless device (18) at a buffer position that corresponds to the HARQ feedback buffer index comprised in the DCI message; and
  a flag storing module (40-3) operable to, upon determining that a NACK flag is stored in the HARQ feedback buffer of the wireless device (18) at the buffer position that corresponds to the HARQ feedback buffer index comprised in the DCI message, maintain a NACK flag in the feedback buffer of the wireless device (18) at the buffer position that corresponds to the HARQ feedback buffer index comprised in the DCI message even though the reception of data for the current subframe was successful.

Embodiment 47a: A method of operation of a radio access node (14) in a cellular communications system (10), comprising:
  determining whether a quality of an uplink control channel from a wireless device (18) to the radio access node (14) is less than upper threshold but greater than lower threshold; and
  upon determining that the quality of the uplink control channel is less than the upper threshold but greater than the lower threshold, setting each of a plurality of flags to a Negative Acknowledgement, NACK, flag, wherein the flags has been received from the wireless device (18).

Embodiment 47: A method of operation of a radio access node (14) in a cellular communications system (10), comprising:
  determining whether a quality of an uplink control channel from a wireless device (18) to the radio access node (14) is less than a predefined upper threshold but greater than a predefined lower threshold; and
  upon determining that the quality of the uplink control channel is less than the predefined upper threshold but greater than the predefined lower threshold, setting each of a plurality of bundled HARQ feedback flags that were have to been received from the wireless device (18) via the uplink control channel to a Negative Acknowledgement, NACK, flag.

Embodiment 48: The method of embodiment 47 wherein the plurality of bundled HARQ feedback flags having corresponding indices BI={1, . . . , $BI_{MAX}$} where $BI_{MAX}$ is a predefined value that is greater than 1, and the method further comprises:
  determining whether the quality of the uplink control channel from the wireless device (18) to the radio access node (14) is less than the predefined lower threshold; and
  upon determining that the quality of the uplink control channel is less than the predefined lower threshold, setting one of the plurality of bundled HARQ feedback flags that was to be received from the wireless device (18) via the uplink control channel and that corresponds to index $BI_{MAX}$ to a Discontinuous Transmission, DTX, flags that is indicative of a DCI error.

Embodiment 49: A computer program product comprising instructions which, when executed on at least one processor, cause the at least one processor to carry out the method according to any of embodiments 47-48.

Embodiment 50: A carrier containing the computer program of embodiment 49 wherein the carrier is one of an electronic signal, an optical signal, a radio signal, or a computer readable storage medium.

Embodiment 51: A radio access node (14) for a cellular communications system (10), the radio access node (14) comprising:
  a radio unit (50);
  at least one processor (44); and
  memory (46) storing instructions that are executable by the at least one processor (44) whereby the radio access node (14) is operable to:
    determine whether a quality of an uplink control channel from a wireless device (18) to the radio access node (14) is less than a predefined upper threshold but greater than a predefined lower threshold; and
    upon determining that the quality of the uplink control channel is less than the predefined upper threshold but greater than the predefined lower threshold, set each of a plurality of bundled Hybrid Automatic Repeat Request, HARQ, feedback flags that were have to been received from the wireless device (18) via the uplink control channel to a Negative Acknowledgement, NACK, flag.

Embodiment 52: The radio access node (14) of embodiment 51 wherein the plurality of bundled HARQ feedback flags having corresponding indices BI={1, . . . , $BI_{MAX}$} where $BI_{MAX}$ is a predefined value that is greater than 1, and the radio access node (14) is further operable to:
  determine whether the quality of the uplink control channel from the wireless device (18) to the radio access node (14) is less than the predefined lower threshold; and
  upon determining that the quality of the uplink control channel is less than the predefined lower threshold, set one of the plurality of bundled HARQ feedback flags that was to be received from the wireless device (18) via the uplink control channel and that corresponds to index $BI_{MAX}$ to a Discontinuous Transmission, DTX, flags that is indicative of a DCI error.

Embodiment 53: A radio access node (14) for a cellular communications system (10), the radio access node (14) comprising:
  means for determining whether a quality of an uplink control channel from a wireless device (18) to the radio access node (14) is less than a predefined upper threshold but greater than a predefined lower threshold; and
  means for, upon determining that the quality of the uplink control channel is less than the predefined upper threshold but greater than the predefined lower threshold, setting each of a plurality of bundled Hybrid Automatic Repeat Request, HARQ, feedback flags that were have to been received from the wireless device (18) via the uplink control channel to a Negative Acknowledgement, NACK, flag.

Embodiment 54: A radio access node (14) for a cellular communications system (10), the radio access node (14) comprising:
  a determining module operable to determine whether a quality of an uplink control channel from a wireless device (18) to the radio access node (14) is less than a predefined upper threshold but greater than a predefined lower threshold; and
  a flag setting module operable to, upon determining that the quality of the uplink control channel is less than the predefined upper threshold but greater than the predefined lower threshold, set each of a plurality of bundled Hybrid Automatic Repeat Request, HARQ, feedback flags that were have to been received from the wireless device (18) via the uplink control channel to a Negative Acknowledgement, NACK, flag.

The following acronyms are used throughout this disclosure.

| | |
|---|---|
| 3GPP | Third Generation Partnership Project |
| 5G | Fifth Generation |
| AAS | Advanced Antenna System |
| ACK | Acknowledgement |
| AM | Acknowledged Mode |
| ASIC | Application Specific Integrated Circuit |
| BI | Buffer Index |
| CCE | Control Channel Element |
| CPU | Central Processing Unit |
| DCI | Downlink Control Information |
| DTX | Discontinuous Transmission |
| eNB | Enhanced or Evolved Node B |
| ePDCCH | Enhanced Physical Downlink Control Channel |
| FDD | Frequency Division Duplexing |
| FPGA | Field Programmable Gate Array |
| HARQ | Hybrid Automatic Repeat Request |
| LTE | Long Term Evolution |
| MIMO | Multiple Input Multiple Output |
| MME | Mobility Management Entity |
| ms | Millisecond |
| MTC | Machine Type Communication |
| NACK | Negative Acknowledgement |
| NDI | New Data Indicator |
| OFDM | Orthogonal Frequency Division Multiplexing |
| PDCCH | Physical Downlink Control Channel |
| PDSCH | Physical Downlink Shared Channel |
| P-GW | Packet Data Network Gateway |
| PUCCH | Physical Uplink Control Channel |
| PUSCH | Physical Uplink Shared Channel |
| RAN | Radio Access Network |
| RLC | Radio Link Control |
| RTT | Round Trip Time |
| RV | Redundancy Version |
| S-GW | Serving Gateway |
| SINR | Signal to Interference Plus Noise Ratio |
| TB | Test Bed |

| | |
|---|---|
| TDD | Time Division Duplexing |
| UCI | Uplink Control Information |
| UE | User Equipment |

Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a cellular communications system, comprising:
receiving downlink control information from a radio access node in a first subframe, T, wherein the downlink control information comprises an indication of a Hybrid Automatic Repeat Request, HARQ, timing offset, K; and
transmitting downlink HARQ feedback to the radio access node in a subframe T+K.

2. The method of claim 1 further comprising:
combining a plurality of downlink HARQ feedback flags into a single downlink HARQ feedback transmission;
wherein transmitting the HARQ feedback in the subframe T+K comprises transmitting the single downlink HARQ feedback transmission in the subframe T+K.

3. The method of claim 2 wherein combining the plurality of downlink HARQ feedback flags into the single downlink HARQ feedback transmission comprises jointly encoding the plurality of downlink HARQ feedback flags into a codeword for the single downlink HARQ feedback transmission.

4. The method of claim 2 wherein:
the downlink control information further comprises information that indicates which feedback flags are to be combined into the single downlink HARQ feedback transmission.

5. The method of claim 1 wherein the indication of the HARQ timing offset, K, is a value for the HARQ timing offset, K.

6. The method of claim 1 wherein the indication of the HARQ timing offset, K, is a value, S, wherein the HARQ timing offset K=N+S, where N is a predefined value.

7. The method of claim 1 wherein the indication of the HARQ timing offset, K, is a value, S, wherein the HARQ timing offset K=N+S, where N is a preconfigured value.

8. The method of claim 1 wherein the indication of the HARQ timing offset, K, is a value, S, wherein the HARQ timing offset K=N+S, where N is a predetermined minimum HARQ timing offset of the wireless device.

9. The method of claim 1 wherein the indication of the HARQ timing offset, K, is a value, X, wherein the HARQ timing offset, K, is a function of the value, X.

10. The method of claim 1 wherein the HARQ feedback comprises a HARQ feedback flag, the HARQ feedback flag being an acknowledgement if respective downlink data was successfully received by the wireless device, a negative acknowledgment if the respective downlink data was not successfully received by the wireless device, and an indication of a downlink control information failure if respective downlink control information was not received by the wireless device.

11. A wireless device for a cellular communications system, comprising:
a transceiver;
at least one processor; and
memory storing instructions that are executable by the at least one processor whereby the wireless device is operable to:
receive, via the transceiver, downlink control information from a radio access node in a first subframe, T, wherein the downlink control information comprises an indication of a Hybrid Automatic Repeat Request, HARQ, timing offset, K; and
transmit, via the transceiver, downlink HARQ feedback to the radio access node in a subframe T+K.

12. A method of operation of a radio access node in a cellular communications system, comprising:
transmitting downlink control information to a wireless device in a first subframe, T, wherein the downlink control information comprises an indication of a Hybrid Automatic Repeat Request, HARQ, timing offset, K; and
receiving downlink HARQ feedback from the wireless device in a subframe T+K.

13. The method of claim 12 wherein:
the downlink HARQ feedback in the subframe T+K comprises a single downlink HARQ feedback transmission in the subframe T+K that is a combination of a plurality of downlink HARQ feedback flags.

14. The method of claim 13 herein the single downlink HARQ feedback transmission is representative of a joint encoding of the plurality of downlink HARQ feedback flags.

15. The method of claim 13 wherein:
the downlink control information further comprises information that indicates which feedback flags are to be combined into the single downlink HARQ feedback transmission.

16. The method of claim 12 wherein the indication of the HARQ timing offset, K, is a value for the HARQ timing offset, K.

17. The method of claim 12 wherein the indication of the HARQ timing offset, K, is a value, S, wherein the HARQ timing offset K=N+S, where N is a predefined value.

18. The method of claim 12 wherein the indication of the HARQ timing offset, K, is a value, S, wherein the HARQ timing offset K=N+S, where N is a preconfigured value.

19. The method of claim 12 wherein the indication of the HARQ timing offset, K, is a value, S, wherein the HARQ timing offset K=N+S, where N is a predetermined minimum HARQ timing offset of the wireless device.

20. The method of claim 12 wherein the indication of the HARQ timing offset, K, is a value, X, wherein the HARQ timing offset, K, is a function of the value, X.

21. The method of claim 12 wherein the HARQ feedback comprises a HARQ feedback flag, the HARQ feedback flag being an acknowledgement if respective downlink data was successfully received by the wireless device, a negative acknowledgment if the respective downlink data was not successfully received by the wireless device, and an indication of a downlink control information failure if respective downlink control information was not received by the wireless device.

22. A radio access node for a cellular communications system, comprising:
at least one radio unit;
at least one processor; and memory storing instructions that are executable by the at least one processor whereby the radio access node is operable to:
  transmit, via the at least one radio unit, downlink control information to a wireless device in a first subframe, T, wherein the downlink control information comprises an indication of a Hybrid Automatic Repeat Request, HARQ, timing offset, K; and
  receive, via the at least one radio unit, downlink HARQ feedback from the wireless device in a subframe T+K.

* * * * *